(12) United States Patent
Horiuchi et al.

(10) Patent No.: US 11,828,893 B2
(45) Date of Patent: Nov. 28, 2023

(54) RADIATION DETECTOR AND RADIOGRAPHY APPARATUS

(71) Applicant: FUJIFILM CORPORATION, Tokyo (JP)

(72) Inventors: Hisatsugu Horiuchi, Kanagawa (JP);
Takashi Tajima, Kanagawa (JP);
Masakazu Fukuyo, Kanagawa (JP);
Naoyuki Nishino, Kanagawa (JP);
Takeyasu Kobayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/807,383

(22) Filed: Jun. 17, 2022

(65) Prior Publication Data
US 2023/0019809 A1   Jan. 19, 2023

(30) Foreign Application Priority Data

Jul. 19, 2021   (JP) .................................. 2021-118902

(51) Int. Cl.
*G01T 1/20*   (2006.01)
*G01T 7/00*   (2006.01)

(52) U.S. Cl.
CPC .............. *G01T 7/00* (2013.01); *G01T 1/2018* (2013.01)

(58) Field of Classification Search
CPC ....... G01T 7/00; G01T 1/2018; G01T 1/2985; G01T 1/20188
See application file for complete search history.

(56) References Cited

U.S. PATENT DOCUMENTS

| | | | |
|---|---|---|---|
| 2013/0306877 A1* | 11/2013 | Pohan | G01T 1/2985 250/394 |
| 2014/0226795 A1* | 8/2014 | Kitano | A61B 6/56 378/189 |
| 2021/0153825 A1 | 5/2021 | Shizukuishi | |

FOREIGN PATENT DOCUMENTS

JP   6858317 B1   4/2021

* cited by examiner

*Primary Examiner* — Kiho Kim
(74) *Attorney, Agent, or Firm* — SOLARIS Intellectual Property Group, PLLC

(57) ABSTRACT

A radiation detector includes a support table, a sensor panel, a fixing member, and a contact member. An attachment surface having an arc surface shape is formed in the support table. The sensor panel has an imaging region in which a plurality of pixels detecting radiation are two-dimensionally arranged. A first surface of the sensor panel is attached to the attachment surface following the arc surface shape. The fixing member partially fixes the first surface to the attachment surface. The contact member comes into contact with a second surface of the sensor panel which is opposite to the first surface to suppress the lifting of the sensor panel from the support table.

22 Claims, 25 Drawing Sheets

FIG. 15

IRRADIATION CONDITION TABLE  141

| IMAGING PROCEDURE | | | IRRADIATION CONDITIONS (TUBE VOLTAGE TUBE CURRENT IRRADIATION TIME) | | | |
|---|---|---|---|---|---|---|
| STANDING POSTURE | HEAD | ADULT MALE | 100KV | 10mA | 0.5ms | ⋮ |
| STANDING POSTURE | HEAD | ADULT FEMALE | 100KV | 10mA | 0.5ms | ⋮ |
| STANDING POSTURE | NECK | ADULT MALE | 80KV | 8mA | 0.5ms | ⋮ |
| ⋮ | | | ⋮ | | | |
| SITTING POSTURE | SPINE | ADULT MALE | 120KV | 12mA | 0.5ms | ⋮ |
| SITTING POSTURE | SPINE | ADULT FEMALE | 120KV | 12mA | 0.5ms | ⋮ |
| ⋮ | | | ⋮ | | | |

156

RADIATION DETECTOR AND RADIOGRAPHY APPARATUS

CROSS-REFERENCE TO RELATED APPLICATIONS

The present application claims priority under 35 U.S.C. § 119 to Japanese Patent Application No. 2021-118902, filed on Jul. 19, 2021. The above application is hereby expressly incorporated by reference, in its entirety, into the present application.

BACKGROUND

1. Technical Field

The technology of the present disclosure relates to a radiation detector and a radiography apparatus.

2. Description of the Related Art

A radiography apparatus is known which irradiates a subject with radiation from a radiation source and detects the radiation transmitted through the subject with a radiation detector to obtain a radiographic image of the subject. For example, JP6858317B discloses, as the radiography apparatus, a computed tomography (hereinafter, abbreviated to CT) apparatus that images a subject in a standing posture or a sitting posture.

The CT apparatus disclosed in JP6858317B comprises a radiation detector including a plurality of complementary metal oxide semiconductor (CMOS) solid-state imaging elements. In JP6858317B, the plurality of CMOS solid-state imaging elements are arranged in a circumferential direction and/or a height direction (the body axis direction of the subject) of an annular gantry and have an arc surface shape following the gantry as a whole. One CMOS solid-state imaging element has a size of, for example, 44 mm×33 mm.

SUMMARY

However, a sensor panel using a thin film transistor (hereinafter, abbreviated to a TFT) can have a larger area and a higher resolution than the CMOS solid-state imaging element. For example, the sensor panel has a size of 17 inches (about 432 mm×about 432 mm) and a pixel pitch of 150 μm.

A case is considered in which a substrate of a sensor panel is made of a flexible material, such as a resin, and the sensor panel having a curved surface shape, such as the arc surface shape described in JP6858317B, is incorporated into a radiation detector. In this case, the sensor panel is attached to a support table which is made of, for example, metal and is processed in a curved surface shape with high accuracy. However, there is a concern that the sensor panel will not be held stably, depending on how to attach the sensor panel. For example, wrinkles caused by thermal expansion and contraction may occur in the sensor panel, or an end portion of the sensor panel may be lifted from the support table because of the difference between the thermal expansion coefficients (also referred to as linear expansion coefficients or thermal expansion rates) of the sensor panel and the support table. Since the sensor panel has a relatively large area, a major problem is the above-mentioned adverse effect caused by heat.

One embodiment according to the technology of the present disclosure provides a radiation detector and a radiography apparatus that can stably hold a sensor panel.

According to an aspect of the present disclosure, there is provided a radiation detector comprising: a support table in which an attachment surface having a curved surface shape is formed; a sensor panel that has an imaging region in which pixels, which include thin film transistors and detect radiation, are two-dimensionally arranged and has a first surface attached to the attachment surface following the curved surface shape; a fixing member that partially fixes the first surface to the attachment surface; and a contact member that comes into contact with a second surface of the sensor panel which is opposite to the first surface.

Preferably, the contact member biases the sensor panel to the attachment surface.

Preferably, the sensor panel is fixed to the attachment surface by the fixing member at least in a central portion of the first surface.

Preferably, the sensor panel is fixed to the attachment surface by the fixing member at symmetrical positions around a central portion of the first surface.

Preferably, a plurality of the fixing members are provided, and positions fixed by the plurality of fixing members are arranged at equal intervals.

Preferably, a plurality of the fixing members are provided, and regions fixed by the plurality of fixing members have the same size.

Preferably, a region fixed by the fixing member has a regular polygonal shape or a circular shape.

Preferably, the contact member is deformed according to thermal expansion and contraction of the sensor panel in a direction parallel to the attachment surface.

Preferably, in the contact member, a first length along a normal direction to the attachment surface is larger than a second length along a direction parallel to the attachment surface.

Preferably, a surface of the contact member which comes into contact with the second surface has a shape following the curved surface shape.

Preferably, the radiation detector further comprises a holding member that holds the contact member and has a higher rigidity than the contact member.

Preferably, the second surface has the imaging region and a non-imaging region which is provided around the imaging region and in which the pixels are not arranged, and the contact member comes into contact with the non-imaging region.

Preferably, a circuit board is attached to a first side of the sensor panel, and the contact member biases the sensor panel to the attachment surface and includes a first contact member that is disposed on the first side and a second contact member that is disposed on a second side of the sensor panel which faces the first side and to which the circuit board is not attached. Preferably, the first contact member has a higher biasing force than the second contact member.

Preferably, a circuit board is attached to the sensor panel, and a radiation shielding member that shields the radiation to protect the circuit board is attached to the contact member.

Preferably, a substrate of the sensor panel has a thickness that is equal to or less than 100 μm.

Preferably, the support table is made of metal, and a substrate of the sensor panel is made of a resin.

Preferably, the number of sensor panels is two or more.

According to another aspect of the present disclosure, there is provided a radiography apparatus comprising the above-described radiation detector and a radiation source that emits the radiation.

Preferably, the radiography apparatus further comprises: an annular frame to which the radiation detector and the radiation source are attached and in which a subject is positioned in a cavity; and a rotation mechanism that rotates the frame around the subject to capture radiographic images of the subject at different angles. Preferably, the curved surface shape is an arc surface shape.

Preferably, the radiography apparatus is a computed tomography apparatus that obtains a tomographic image of the subject on the basis of the radiographic images captured at different angles.

Preferably, the radiation source emits the radiation having a conical shape.

Preferably, the subject is positioned in the cavity in either a standing posture or a sitting posture.

According to the technology of the present disclosure, it is possible to provide a radiation detector and a radiography apparatus that can stably hold a sensor panel.

BRIEF DESCRIPTION OF THE DRAWINGS

Exemplary embodiments according to the technique of the present disclosure will be described in detail based on the following figures, wherein:

FIG. 15 is a diagram illustrating an irradiation condition table;

DETAILED DESCRIPTION

Figure 1:
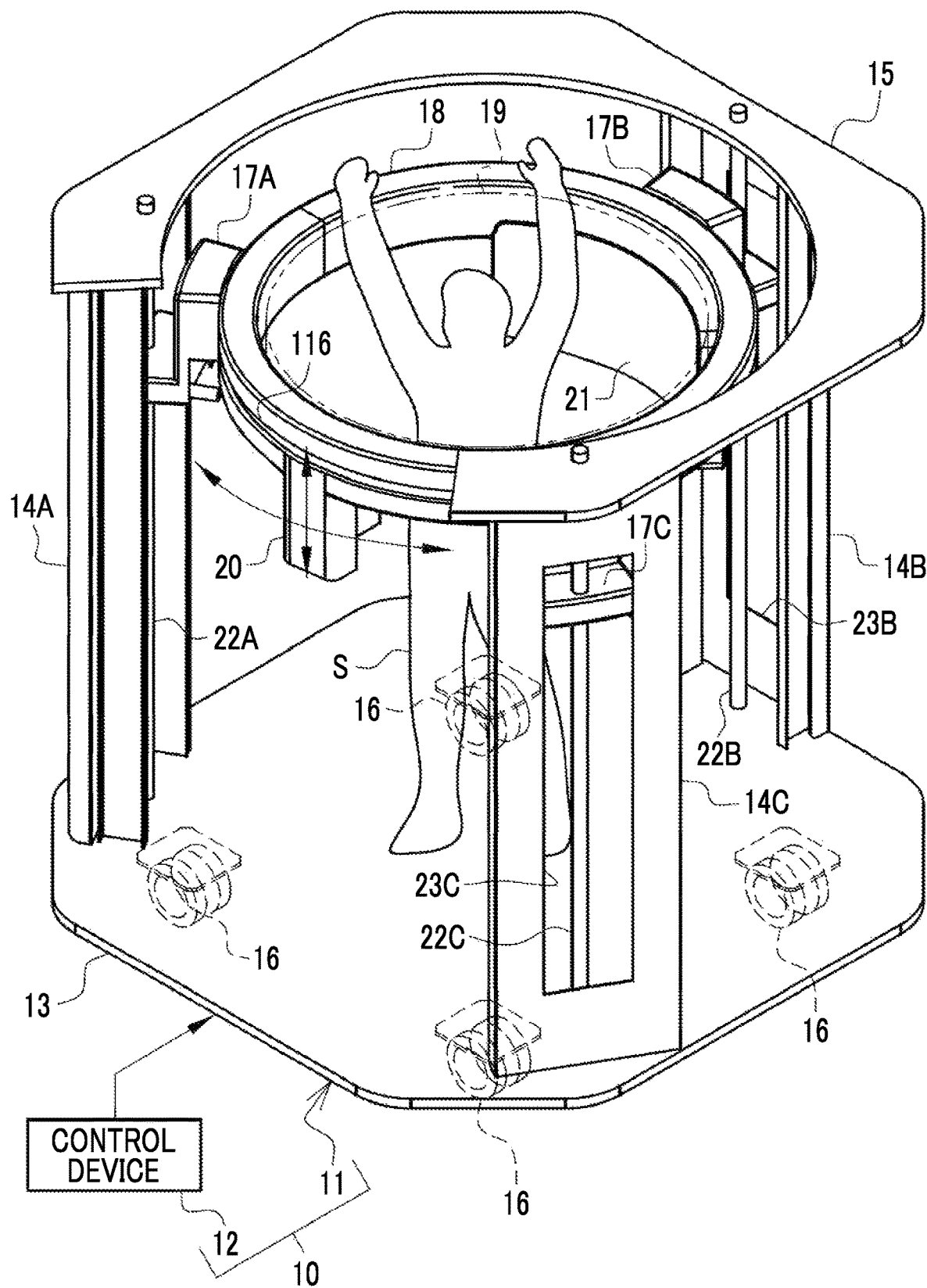
FIG. 1 is a perspective view illustrating a CT apparatus.
Figure 2:
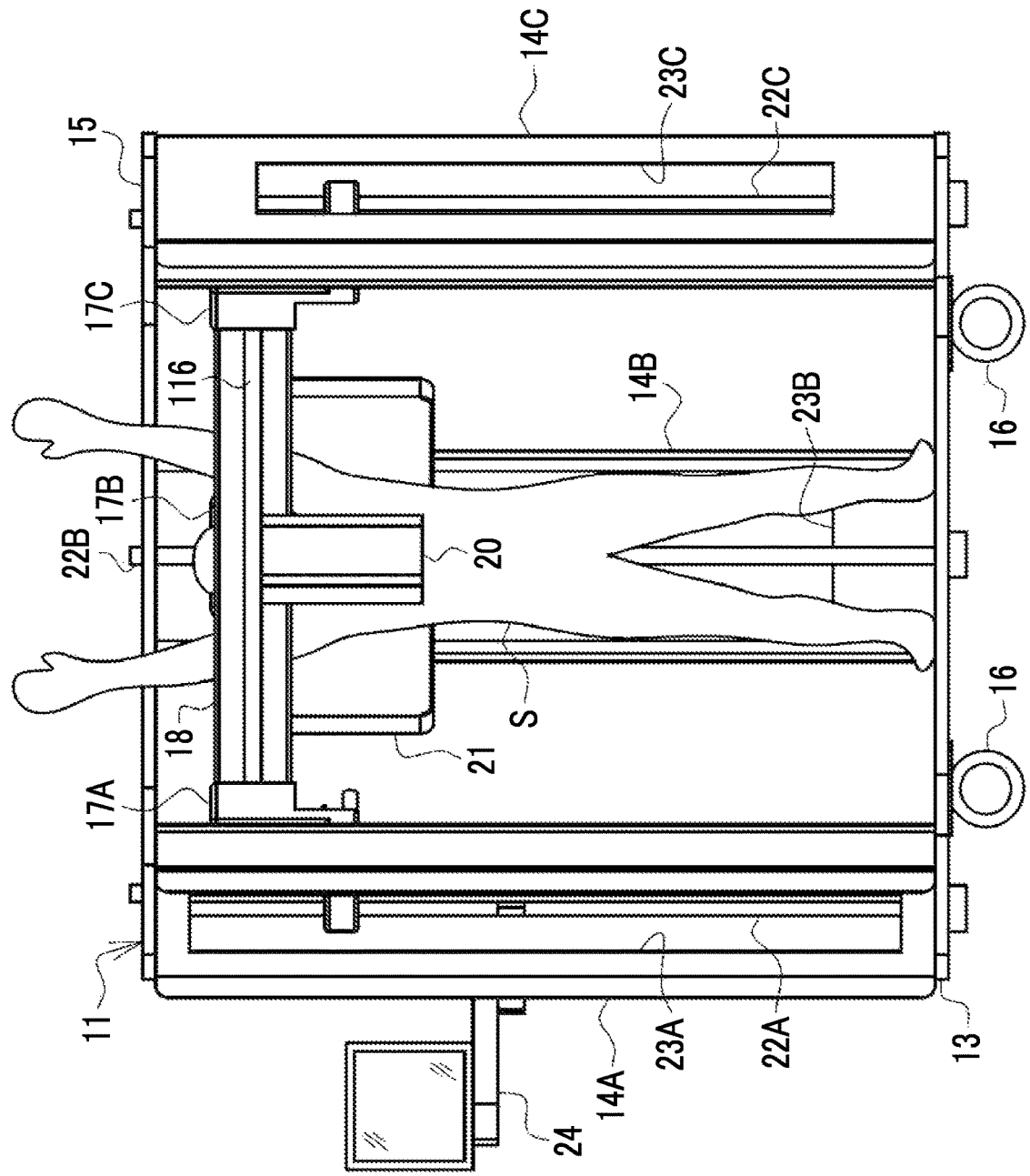
FIG. 2 is a front view illustrating an apparatus main body of the CT apparatus.
Figure 3:
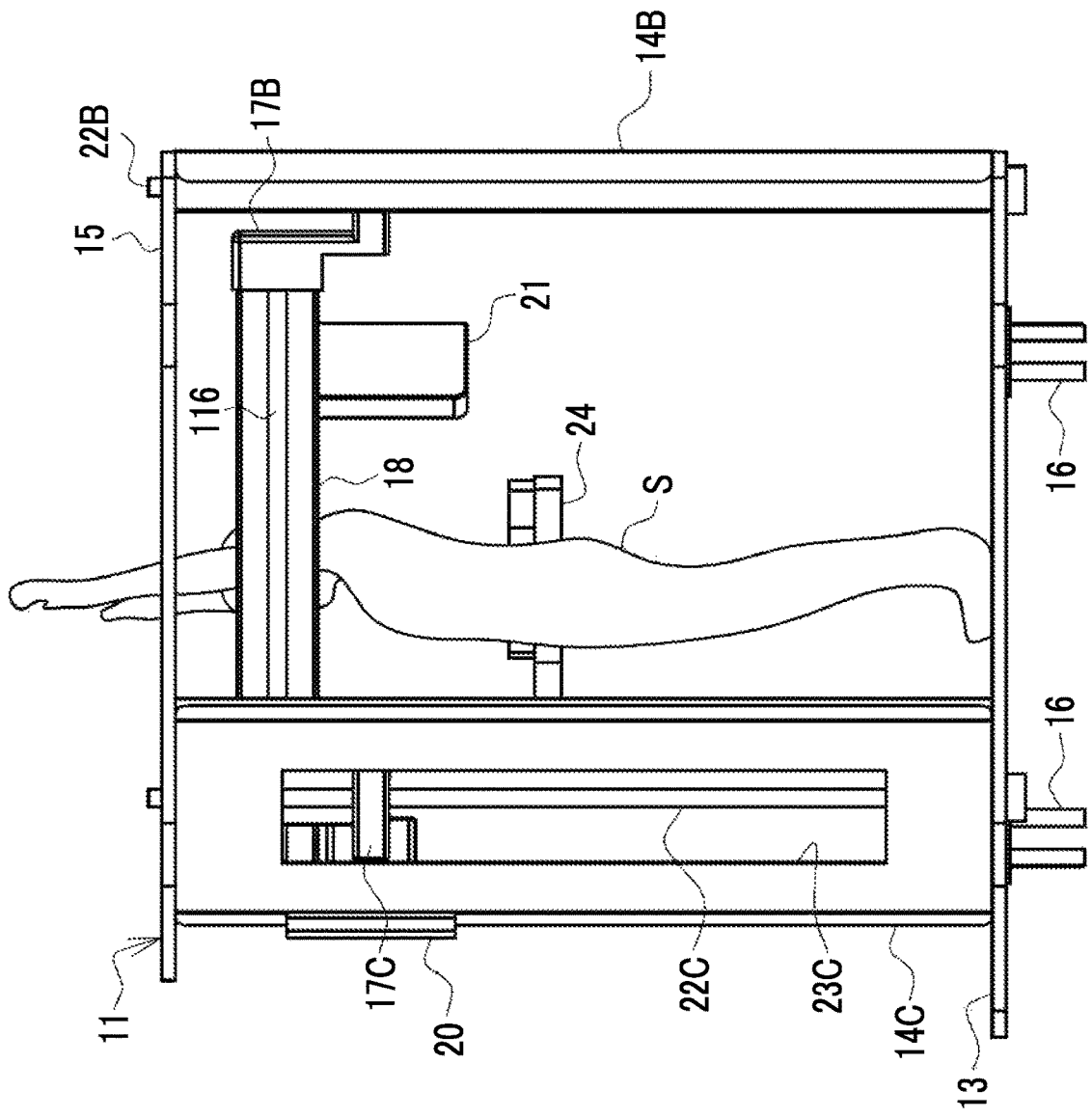
FIG. 3 is a side view illustrating the apparatus main body of the CT apparatus.

For example, as illustrated in FIG. 1, a CT apparatus 10 is an apparatus for obtaining a tomographic image TI (see FIG. 17) of a subject S and includes an apparatus main body 11 and a control device 12. The apparatus main body 11 is installed, for example, in a radiography room of a medical facility. The control device 12 is installed, for example, in a control room next to the radiography room. The control device 12 is a desktop personal computer, a notebook personal computer, or a tablet terminal. The CT apparatus 10 is an example of a "radiography apparatus" according to the technology of the present disclosure.

For example, as illustrated in FIGS. 1 to 4, the apparatus main body 11 comprises a stage 13, three columns 14A, 14B, and 14C, and a top plate 15. The stage 13 is an octagonal flat surface. Casters 16 for transportation are attached to four corners of a rear surface of the stage 13.

The caster 16 comprises a rotation lock mechanism (not illustrated). After the apparatus main body 11 is installed at an installation position, the rotation lock mechanism can be operated to lock the rotation of the caster 16. Alternatively, the caster 16 can be removed from the stage 13. The caster 16 can be removed after the apparatus main body 11 is installed at the installation position.

The outer shape of the columns 14A to 14C is a rectangular plate shape, and the columns 14A to 14C are vertically provided at four corners of the surface of the stage 13. The columns 14A and 14C are disposed on the front left and right sides of the apparatus main body 11 (the front left and right sides of the subject S). The column 14B is disposed at the center of the rear side of the apparatus main body 11 (behind the subject S). The top plate 15 is attached to the upper end portions of the columns 14A to 14C. The top plate 15 is an octagonal flat surface having an outer shape following the stage 13. The top plate 15 has a C-shape in which a central portion is hollowed out in a circular shape and a portion corresponding to the front side of the apparatus main body 11 between the columns 14A and 14C is cut out. Further, in the following description, the columns 14A to 14C are collectively referred to as columns 14 in a case in which they do not need to be distinguished from each other.

A connection member 17A is connected to the column 14A, a connection member 17B is connected to the column 14B, and a connection member 17C is connected to the column 14C. A frame 18 is connected to the connection members 17A to 17C. That is, the columns 14A to 14C and the frame 18 are connected to each other through the connection members 17A to 17C. Furthermore, in the following description, the connection members 17A to 17C are collectively referred to as connection members 17 in a case in which they do not need to be distinguished from each other.

The frame 18 has an annular shape. The subject S is positioned at a center C (see FIG. 4) of a cavity 19 of the annular frame 18. FIGS. 1 to 4 illustrate an aspect in which the subject S in a standing posture with both hands raised above the head is positioned.

The column 14 is provided with a guide rail (not illustrated) to which the connection member 17 is fitted. The connection member 17 and thus the frame 18 can be moved up and down in the vertical direction along the guide rail. That is, the columns 14 hold the frame 18 so as to be movable up and down in the vertical direction. In addition, the frame 18 can be rotated around the subject S using the center C as a central axis. That is, the columns 14A to 14C hold the frame 18 so as to be rotatable around the subject S. Further, the height position of the frame 18 may be changed by expanding and contracting the columns 14.

A radiation source 20 that emits radiation R (see FIG. 6), such as X-rays or γ-rays, and a radiation detector 21 that detects the radiation R are attached to the frame 18. Both the radiation source 20 and the radiation detector 21 protrude from a lower edge of the frame 18. The radiation source 20 and the radiation detector 21 are disposed at opposite positions (positions that are 180° away from each other) of the frame 18. The radiation source 20 has a box shape, and the radiation detector 21 has a pad shape. In a plan view of the frame 18 or the like from above, the radiation detector 21 has an arc surface shape (U-shape) that follows the shape of the frame 18.

The column 14A is provided with a screw shaft 22A, the column 14B is provided with a screw shaft 22B, and the column 14C is provided with a screw shaft 22C. The screw shafts 22A to 22C have a height from the stage 13 to the top plate 15. The screw shafts 22A to 22C are rotated such that the connection members 17A to 17C and thus the frame 18 are moved up and down in the vertical direction. In addition, in the following description, the screw shafts 22A to 22C are collectively referred to as screw shafts 22 in a case in which they do not need to be distinguished from each other.

The column 14A has an opening 23A, the column 14B has an opening 23B, and the column 14C has an opening 23C. The openings 23A to 23C are formed by hollowing out most of the columns 14A to 14C in a rectangular shape, respectively. The subject S can be visually recognized from the outside of the apparatus main body 11 through the openings 23A to 23C. Each of the columns 14A to 14C partially looks like two columns because of each of the openings 23A to 23C. However, since the column is connected at the top and bottom of each of the openings 23A to 23C, the number is columns is one.

A touch panel display 25 is attached to the column 14A through a movable arm 24. The touch panel display 25 is operated by an operator of the CT apparatus 10 such as a radiology technician. Further, the touch panel display 25 displays various kinds of information to the operator.

Figure 4:
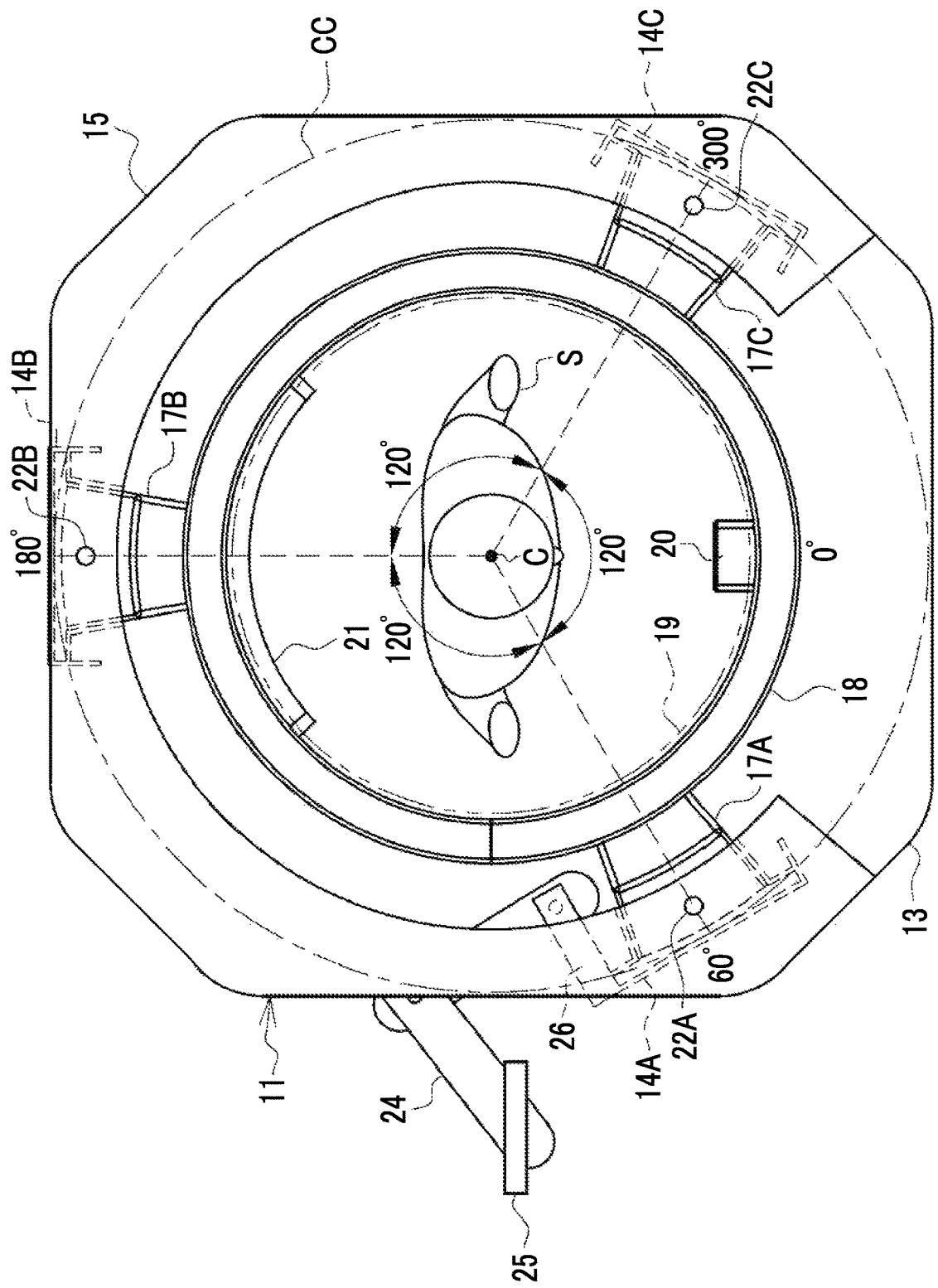
FIG. 4 is a top view illustrating the apparatus main body of the CT apparatus.

In FIG. 4 which is a plan view of the frame 18 and the like from above, in a case in which the position where the radiation source 20 is located in front of the apparatus main body 11 is set as a position of 0°, the column 14A is disposed at a position of 60° on a circle CC having the center C of the frame 18 as its center, the column 14B is disposed at a position of 180° on the circle CC, and the column 14C is disposed at a position of 300° on the circle CC. That is, the columns 14A to 14C are disposed at intervals of 120° on the circle CC. In addition, angles, such as "0°" and "60°", indicate, for example, "0°" and "60°" including an error (for example, an error of about 1% to 10%) that is generally allowed in the technical field to which the technology of the present disclosure belongs and does not depart from the gist of the technology of the present disclosure, in addition to perfect "0°" and "60°". Further, the term "equal interval" indicates an "equal interval" including an error (for example, an error of about 1% to 10%) that is generally allowed in the technical field to which the technology of the present disclosure belongs and does not depart from the gist of the technology of the present disclosure, in addition to a perfect "equal interval".

Figure 5:
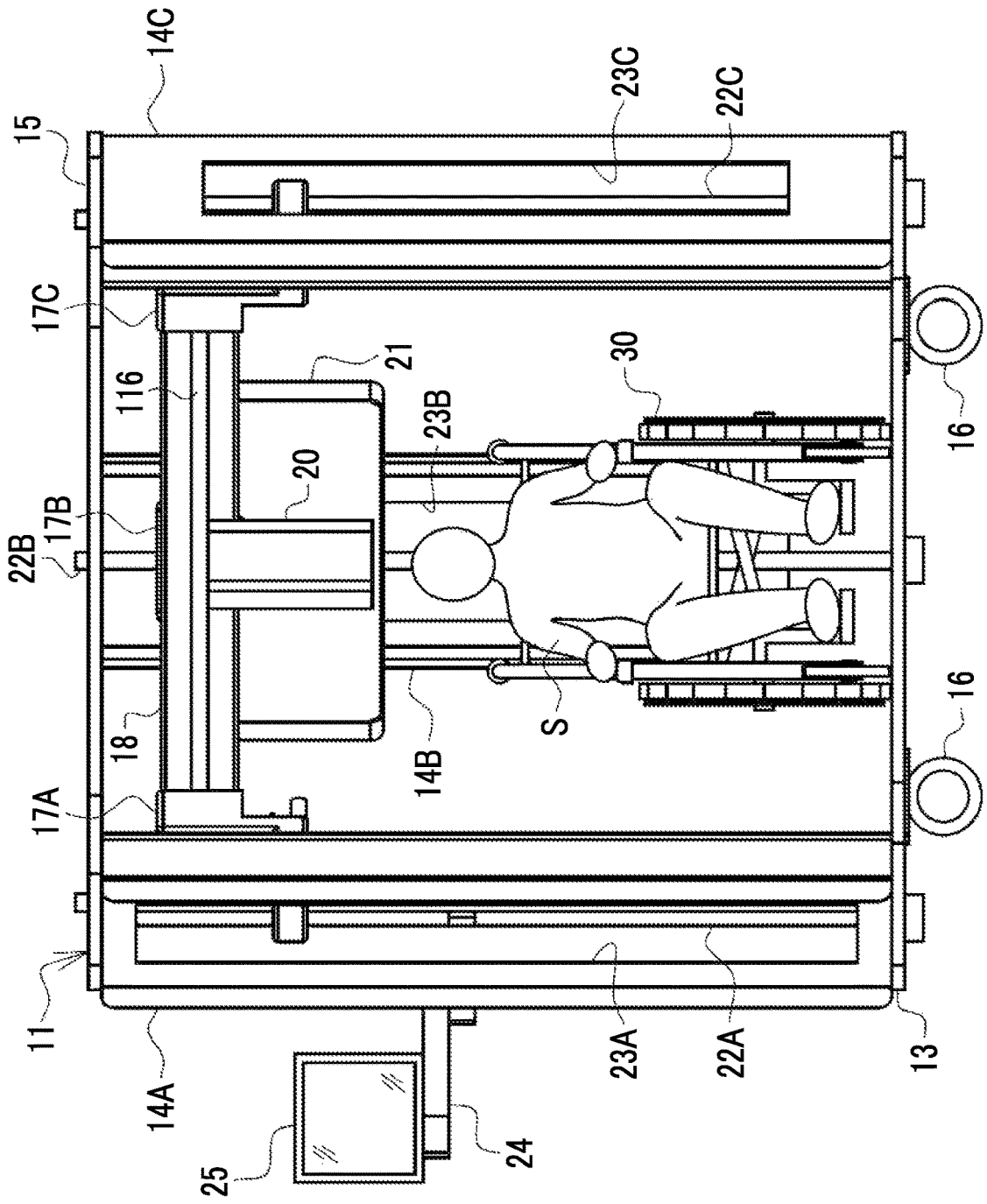
FIG. 5 is a front view illustrating the apparatus main body of the CT apparatus in a state in which a subject in a sitting posture on a wheelchair is positioned.

FIGS. 1 to 4 illustrate an example in which the subject S in a standing posture with both hands raised above the head is positioned in the cavity 19. However, the present disclosure is not limited to thereto. For example, as illustrated in FIG. 5, the CT apparatus 10 can image the subject S who is positioned in the cavity 19 in a sitting posture on a wheelchair 30. In addition, both the subject S in the standing posture and the subject S in the sitting posture on the wheelchair 30 are positioned so as to face the front at the position of 0°.

Figure 6:
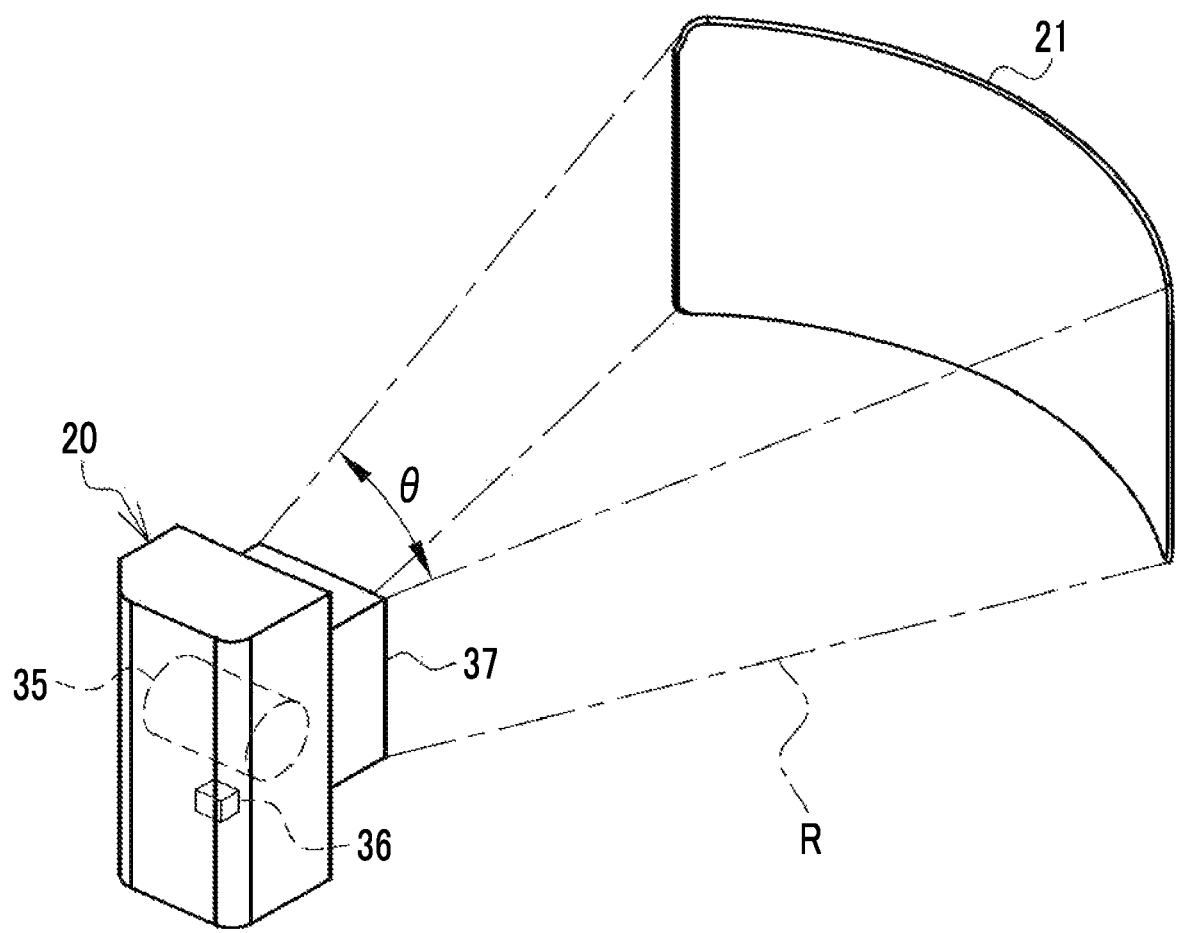
FIG. 6 is a perspective view illustrating a radiation source, a radiation detector, and radiation.

For example, as illustrated in FIG. 6, the radiation source 20 includes a radiation tube 35 and an irradiation field lamp 36. The radiation tube 35 emits the radiation R. The irradiation field lamp 36 emits, for example, orange visible light indicating the irradiation field of the radiation R.

Further, the radiation source 20 includes an irradiation field limiter 37. The irradiation field limiter 37 is also called a collimator and defines the irradiation field of the radiation R to the radiation detector 21. An incident opening through which the radiation R from the radiation tube 35 is incident and an exit opening through which the radiation R exits are formed in the irradiation field limiter 37. For example, four shielding plates are provided in the vicinity of the exit opening. The shielding plate is made of a material that shields the radiation R, for example, lead. The shielding plates are disposed on each side of a quadrangle, in other words, are assembled in a checkered pattern and form a quadrangular irradiation opening through which the radiation R is transmitted. The irradiation field limiter 37 changes the position of each shielding plate to change the size of the irradiation opening, thereby changing the irradiation field of the radiation R to the radiation detector 21. The radiation R having a quadrangular pyramid shape is emitted from the radiation source 20 by the operation of the irradiation field limiter 37. An irradiation angle θ of the radiation R is, for example, 45°.

Figure 7:
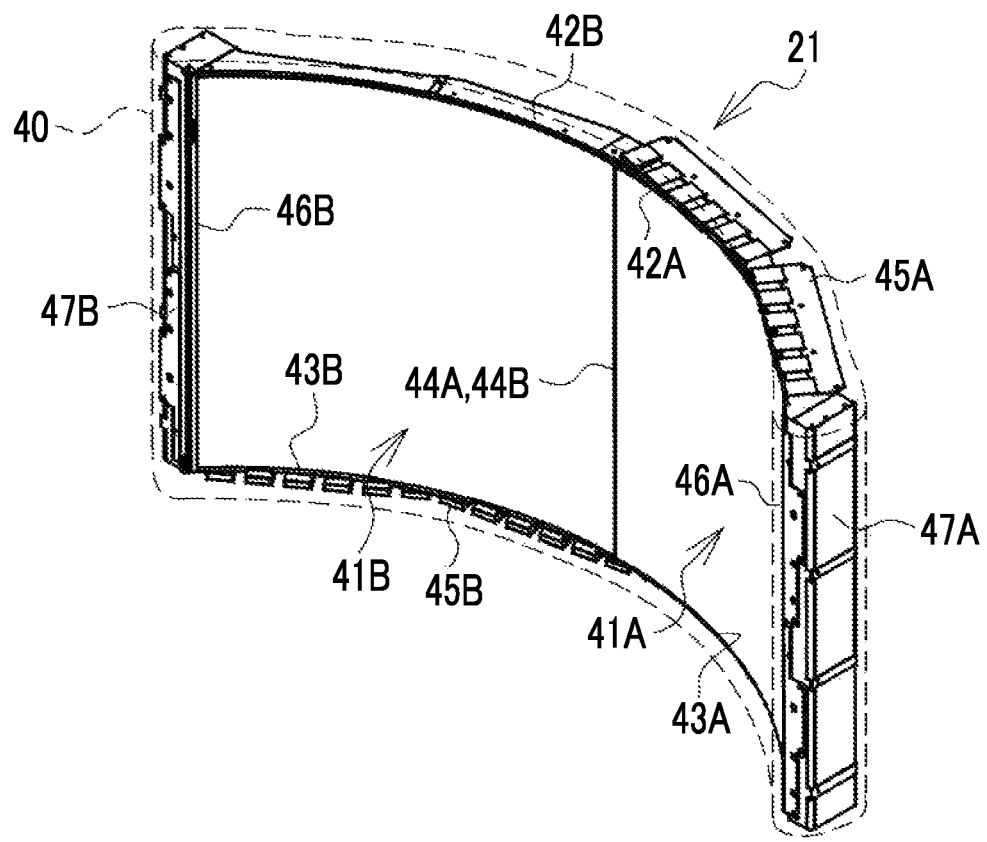
FIG. 7 is a perspective view illustrating the inside of the radiation detector.

For example, as illustrated in FIG. 7, the radiation detector 21 includes a housing 40 having an arc surface shape that follows the shape of the frame 18. The housing 40 is made of, for example, carbon. Two sensor panels 41A and 41B using TFTs are accommodated in the housing 40. The sensor panels 41A and 41B have a square shape having a size of, for example, 17 inches (about 432 mm×about 432 mm). In the sensor panel 41A, opposite sides 42A and 43A are curved in an arc shape that follows the shape of the frame 18. Similarly, in the sensor panel 41B, opposite sides 42B and 43B are curved in an arc shape that follows the shape of the frame 18. The sensor panels 41A and 41B overlap each other on sides 44A and 44B which are not curved in an arc shape.

A reading circuit board 45A is attached to the side 42A, and a reading circuit board 45B is attached to the side 43B. Nothing is attached to the side 42B facing the side 43B and the side 43A facing the side 42A. The sides 42A and 43B and thus the reading circuit boards 45A and 45B have a so-called two-fold symmetric relationship in which they are located at positions that are aligned with each other in a case in which they are rotated 180° about the center of the radiation detector 21. The reading circuit boards 45A and 45B are examples of a "circuit board" according to the technology of the present disclosure. Further, the sides 42A and 43B are examples of a "first side" according to the technology of the present disclosure, and the sides 42B and 43A are examples of a "second side" according to the technology of the present disclosure.

A switching circuit board 47A is attached to a side 46A facing the side 44A, and a switching circuit board 47B is attached to a side 46B facing the side 44B. The switching circuit boards 47A and 47B are also examples of the "circuit board" according to the technology of the present disclosure. In addition, the sensor panels 41A and 41B have the same basic configuration, such as the same attachment structure (see FIG. 10), except that the reading circuit boards 45A and 45B are attached to different sides 42A and 43B. Therefore, the sensor panel 41A will be mainly described below. In addition, similarly to the columns 14A to 14C and the like, hereinafter, the sensor panels 41A and 41B and each component attached thereto may be represented by only numbers without letters "A" and "B".

Figure 8:
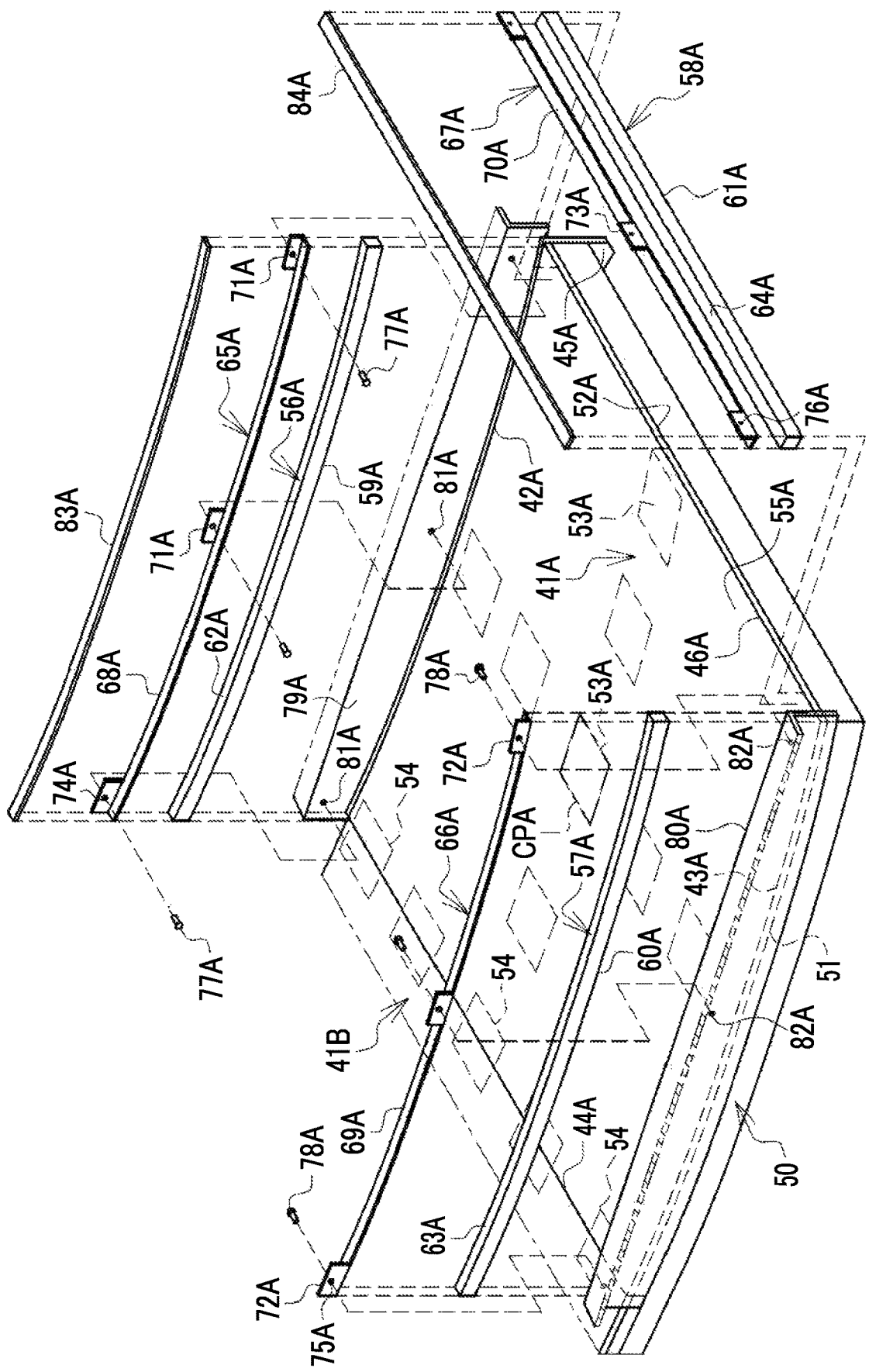
FIG. 8 is a perspective view illustrating an attachment structure of the sensor panel.
Figure 9:
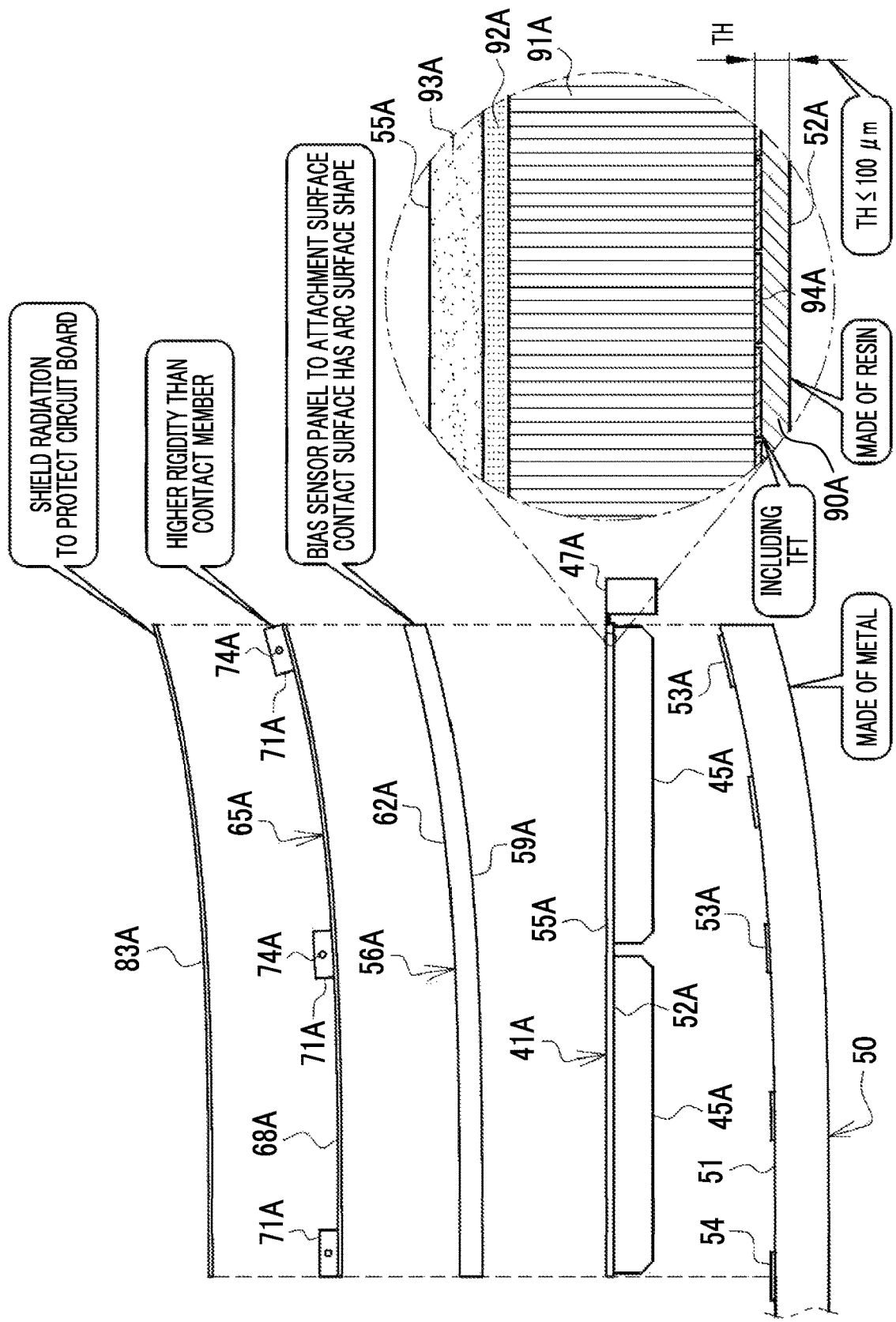
FIG. 9 is a plan view illustrating the attachment structure of the sensor panel and a detailed configuration of the sensor panel.

For example, as illustrated in FIGS. 8 and 9, the sensor panel 41A is attached to a support table 50. The support table 50 is made of metal, such as aluminum or copper, and has an attachment surface 51 that is accurately processed in an arc surface shape (U-shape) which is convex toward the opposite side of the radiation source 20 so as to follow the shape of the frame 18. A first surface 52A of the sensor panel 41A is attached to the attachment surface 51. The curvature radius of the attachment surface 51 is, for example, 500 mm. A member (not illustrated) that is made of, for example, lead and shields the radiation R is attached to a surface of the support table 50 which is opposite to the attachment surface 51. In addition, in FIG. 8, the switching circuit board 47A is not illustrated in order to avoid complication. Here, the "U-shape" is a shape in which the entire surface of the sensor panels 41A and 41B including imaging regions 100A and 100B (see FIG. 10) and the end portions of the sides 44A and 44B which overlap each other is curved. Specifically, the "U-shape" means a shape in which both end portions protrude toward one side and both end portions and a central portion are connected by a curved surface.

The first surface 52A of the sensor panel 41A is partially fixed to the attachment surface 51 by fixing members 53A and fixing members 54. Eight fixing members 53A are disposed in a cross shape around a central portion CPA of the first surface 52A. Specifically, the fixing members 53A are arranged at equal intervals along the sides 42A and 43A and are arranged at equal intervals along the sides 44A and 46A. Five fixing members 54 are arranged at equal intervals on the side 44A which is a portion coupled to the sensor panel 41B. The regions fixed by the fixing members 53A and 54 have the same size. Further, both the fixing members 53A and 54 have a square shape. That is, the regions fixed by the fixing members 53A and 54 have a regular polygonal shape. The fixing members 53A and 54 are, for example, double-sided tapes that are attached to the attachment surface 51 or adhesives that are applied or mask-printed onto the attachment surface 51. In addition, the term "equal interval" indicates an "equal interval" including an error (for example, an error of about 1% to 10%) that is generally allowed in the technical field to which the technology of the present disclosure belongs and that does not depart from the gist of the technology of the present disclosure, in addition to a perfect "equal interval". Further, the term "same" in the "same size" indicates "same" including an error (for example, an error of about 1% to 10%) that is generally allowed in the technical field to which the technology of the present disclosure belongs and does not depart from the gist of the technology of the present disclosure, in addition to exact "same". Furthermore, the term "regular polygonal shape" indicates a "regular polygonal shape" including an error (for example, an error of about 1% to 10%) that is generally allowed in the technical field to which the technology of the present disclosure belongs and does not depart from the gist of the technology of the present disclosure, in addition to a perfect "regular polygonal shape".

Contact members 56A, 57A, and 58A come into contact with a second surface 55A of the sensor panel 41A which is opposite to the first surface 52A. The contact members 56A to 58A have an elongated square column shape. The contact members 56A to 58A are elastic bodies made of various kinds of rubber, such as silicone rubber, nitrile rubber (NBR), and urethane rubber, various elastomers, various flexible resins, such as nylon and vinyl chloride, or various foams, such as foamed polyethylene, foamed acrylic, and foamed urethane.

The contact members 56A to 58A suppress the lifting of the sensor panel 41A from the support table 50. Specifically, the contact member 56A has substantially the same length as the side 42A and comes into contact with the end portion of the sensor panel 41A on the side 42A to suppress the lifting of the end portion of the sensor panel 41A on the side 42A from the support table 50. The contact member 57A has substantially the same length as the side 43A and comes into contact with the end portion of the sensor panel 41A on the side 43A to suppress the lifting of the end portion of the sensor panel 41A on the side 43A from the support table 50. The contact member 58A has a slightly smaller length than the side 46A and comes into contact with the end portion of the sensor panel 41A on the side 46A to suppress the lifting of the end portion of the sensor panel 41A on the side 46A from the support table 50.

A surface 59A (hereinafter, referred to as a contact surface 59A) of the contact member 56A which comes into contact with the second surface 55A has an arc surface shape that follows the arc shape of the side 42A. Similarly, a surface 60A (hereinafter, referred to as a contact surface 60A) of the contact member 57A which comes into contact with the second surface 55A has an arc surface shape that follows the arc shape of the side 43A. In addition, the contact members 56A and 57A have a shape that follows the arc shape of the sides 42A and 43A as a whole. On the other hand, a surface 61A (hereinafter, referred to as a contact surface 61A) of the contact member 58A which comes into contact with the second surface 55A and thus the contact member 58A have a straight shape that follows the linear shape of the side 46A.

A holding member 65A is attached to a surface 62A of the contact member 56A which is opposite to the contact surface 59A. Similarly, a holding member 66A is attached to a surface 63A of the contact member 57A which is opposite to the contact surface 60A. In addition, a holding member 67A is attached to a surface 64A of the contact member 58A which is opposite to the contact surface 61A.

The holding members 65A to 67A hold the contact members 56A to 58A while pressing the contact members 56A to 58A against the sensor panel 41A, respectively. The holding members 65A to 67A are made of a material having a higher rigidity than the contact members 56A to 58A, for example, metal such as aluminum or copper. Since the contact members 56A to 58A are elastic bodies as described above, they are held by the holding members 65A to 67A while being pressed against the sensor panel 41A to bias the sensor panel 41A to the attachment surface 51.

The holding member 65A has a main body portion 68A and three attachment pieces 71A. Similarly, the holding member 66A has a main body portion 69A and three attachment pieces 72A. In addition, the holding member 67A has a main body portion 70A and three attachment pieces 73A. Similarly to the contact members 56A and 57A, the main body portions 68A and 69A have a shape that follows the arc shape as a whole. On the other hand, the main body portion 70A has a straight shape as a whole similarly to the contact member 58A.

The attachment pieces 71A are portions that protrude from both end portions and a central portion of the main body portion 68A to the side opposite to the contact member 56A at a right angle. The attachment pieces 72A are portions that protrude from both end portions and a central portion of the main body portion 69A to the side opposite to the contact member 57A at a right angle. Further, the attachment piece 73A are portions that protrude from both end portions and a central portion of the main body portion 70A to the side opposite to the contact member 58A at a right angle. A screw insertion hole 74A is formed in the attachment piece 71A. A screw insertion hole 75A is formed in the attachment piece 72A. Further, a screw insertion hole 76A is formed in the attachment piece 73A. A screw 77A is inserted into the screw insertion hole 74A. A screw 78A is inserted into the screw insertion hole 75A. Further, a screw (not illustrated) is inserted into the screw insertion hole 76A.

The screw 77A inserted into the screw insertion hole 74A is inserted into a screw hole 81A of an attachment frame 79A that is provided in the support table 50. Therefore, the holding member 65A is fastened and fixed to the attachment frame 79A. The contact member 56A is held while being sandwiched between the holding member 65A and the second surface 55A. The screw 78A inserted into the screw insertion hole 75A is inserted into a screw hole 82A of an attachment frame 80A that is provided in the support table 50. Therefore, the holding member 66A is fastened and fixed to the attachment frame 80A. The contact member 57A is held while being sandwiched between the holding member 66A and the second surface 55A. Further, the screw inserted into the screw insertion hole 76A is inserted into a screw hole (not illustrated) of an attachment frame (not illustrated) that is provided in the support table 50. Therefore, the holding member 67A is fastened and fixed to the attachment frame. The contact member 58A is held while being sandwiched between the holding member 67A and the second surface 55A.

A radiation shielding member 83A is attached to a surface of the main body portion 68A which is irradiated with the radiation R. In addition, a radiation shielding member 84A is attached to a surface of the main body portion 70A which is irradiated with the radiation R. The radiation shielding members 83A and 84A are made of a material that shields the radiation R, for example, lead. The radiation shielding member 83A prevents the reading circuit board 45A from being irradiated with the radiation R to protect the reading circuit board 45A. The radiation shielding member 84A prevents the switching circuit board 47A from being irradiated with the radiation R to protect the switching circuit board 47A. Further, in FIG. 9, the contact members 57A and 58A, the holding members 66A and 67A, and the like are not illustrated in order to avoid complication.

In FIG. 9, the sensor panel 41A has a substrate 90A and a scintillator 91A. The scintillator 91A includes, for example, terbium-activated gadolinium oxysulfide (GOS; $Gd_2O_2S$:Tb) and converts the radiation R into visible light. The scintillator 91A is attached to a support 93A through a pressure-sensitive adhesive layer 92A. The support 93A is made of, for example, white polyethylene terephthalate (PET). A rear surface of the substrate 90A is the first surface 52A, and a front surface of the support 93A is the second surface 55A.

The substrate 90A is a flexible thin film sheet that is made of a resin such as polyimide. The substrate 90A includes fine particles of an inorganic oxide that absorbs backscattered rays. Examples of the inorganic oxide include silicon dioxide ($SiO_2$), magnesium oxide (MgO), aluminum oxide (so-called alumina, $Al_2O_3$), and titanium oxide ($TiO_2$). An example of the substrate 90A having the above-mentioned features is XENOMAX (registered trademark) manufactured by Xenomax Japan Co., Ltd. A thickness TH of the substrate 90A is equal to or less than 100 μm. The thickness TH is more preferably equal to or greater than 20 μm and less than 50 μm (20≤TH<50).

The substrate 90A is provided with the pixels 94A that detect the visible light converted from the radiation R by the scintillator 91A. As is well known, the pixel 94A includes a light receiving unit that senses the visible light and generates charge and a TFT as a switching element that reads out the charge accumulated in the light receiving unit. A plurality of signal lines for inputting the charge of the light receiving units to the reading circuit board 46A and a plurality of scanning lines for giving on/off signals (scanning signals) from the switching circuit board 47A to the TFTs are provided on the substrate 90A so as to intersect each other in the vertical and horizontal directions. The pixels 94A are disposed at the intersections of the plurality of signal lines and scanning lines. That is, the pixels 94A are two-dimensionally arranged. In addition, the pixel 94A may not sense the visible light converted from the radiation R, but may directly sense the radiation R to generate charge.

The pitch of the pixels 94A is, for example, 150 μm. In addition, the regions fixed by the fixing members 53A and 54 have a size that does not cause a deviation equal to or more than the pitch of the pixels 94A between the sensor panel 41A and the support table 50 due to the thermal expansion or contraction of the sensor panel 41A. Further, the positions fixed by the fixing members 53A and 54 have a distance that does not cause a deviation equal to or more than the pitch of the pixels 94A between the sensor panel 41A and the support table 50 due to the thermal expansion or contraction of the sensor panel 41A.

Figure 10:
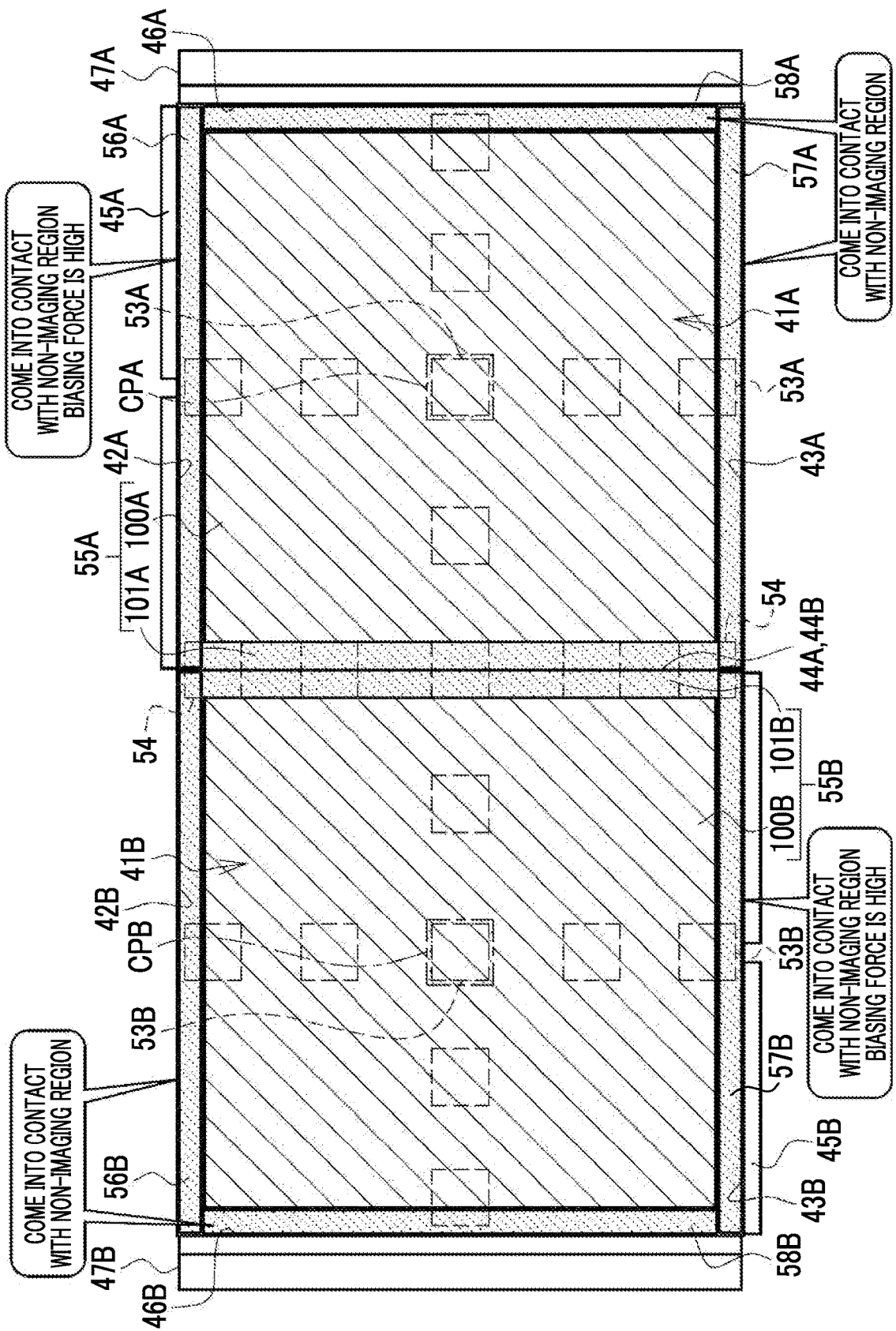
FIG. 10 is a plan view illustrating contact positions of contact members.

As illustrated in FIG. 10 in a state in which the holding members 65A to 67A and the like are removed, the second surface 55A of the sensor panel 41A has an imaging region 100A which has a square shape and in which the pixels 94A are arranged and a non-imaging region 101A which has a rectangular ring shape and surrounds the imaging region 100A and in which the pixels 94A are not arranged. All of the contact members 56A to 58A come into contact with the non-imaging region 101A. Similarly, a second surface 55B of the sensor panel 41B has an imaging region 100B and a non-imaging region 101B. All of contact members 56B, 57B, and 58B that suppress the lifting of the sensor panel 41B from the support table 50 come into contact with the non-imaging region 101B.

The contact member 56B has substantially the same length as the side 42B and comes into contact with the end portion of the sensor panel 41B on the side 42B to suppress the lifting of the end portion of the sensor panel 41B on the side 42B from the support table 50. The contact member 57B has substantially the same length as the side 43B and comes into contact with the end portion of the sensor panel 41B on the side 43B to suppress the lifting of the end portion of the sensor panel 41B on the side 43B from the support table 50. The contact member 58B has a slightly shorter length than the side 46B and comes into contact with the end portion of the sensor panel 41B on the side 46B to suppress the lifting of the end portion of the sensor panel 41B on the side 46B from the support table 50.

The contact member 56A has a higher biasing force than the contact member 57A. Further, the contact member 57B has a higher biasing force than the contact member 56B. The contact members 56A and 57B are examples of a "first contact member" according to the technology of the present disclosure. In addition, the contact members 57A and 56B are examples of a "second contact member" according to the technology of the present disclosure.

As a method for increasing the biasing force, for example, a method can be adopted which increases the amount of pressing of the contact members 56A and 57B to be larger than the amount of pressing of the contact members 57A and 56B. For example, in a case in which the contact members 57A and 56B with a thickness of 10 mm are pressed to 8 mm, the contact members 56A and 57B are pressed from 10 mm to 6 mm. Alternatively, a method may be used in which the elastic force of the contact members 56A and 57B is higher than the elastic force of the contact members 57A and 56B. In addition, reference numeral 53B indicates fixing members that are arranged in a cross shape around a central portion CPB of the first surface of the sensor panel 41B.

Figure 11:
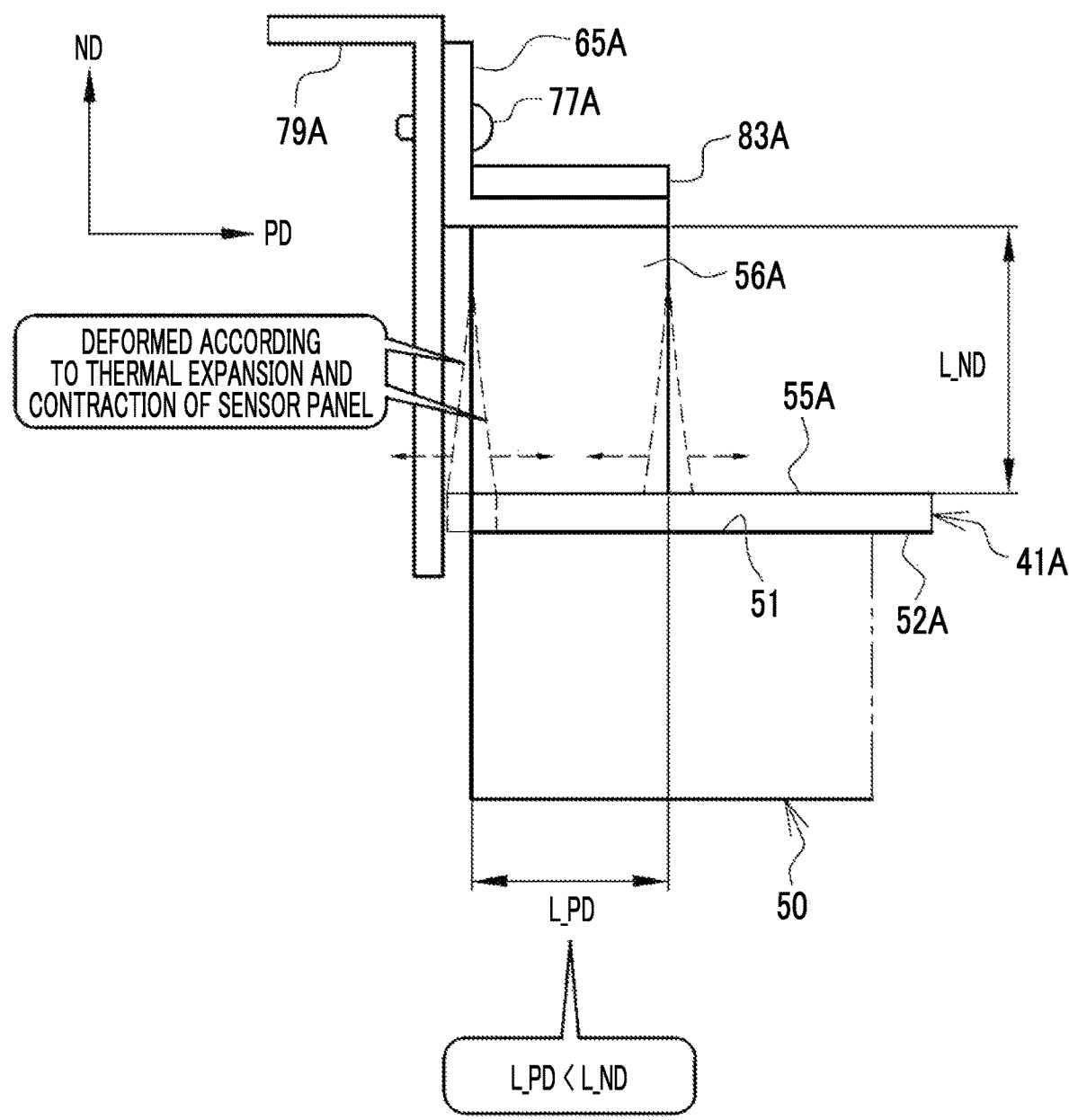
FIG. 11 is a diagram illustrating the degree of deformation and the size of the contact member.

For example, as illustrated in FIG. 11, as represented by a broken line, the sensor panel 41A is thermally expanded and contracted in a direction (hereinafter, referred to as a plane direction) PD parallel to the attachment surface 51 due to heat during driving. The contact member 56A is deformed (shear-deformed) as represented by the broken line according to the thermal expansion and contraction of the sensor panel 41A.

In the contact member 56A, a second length L_PD along a plane direction PD is smaller than a first length L_ND along a normal direction ND to the attachment surface 51 (L_PD<L_ND). In addition, the contact member 56A has been described as an example in FIG. 11. However, the contact members 57A, 58A, and 56B to 58B are also deformed according to the thermal expansion and contraction of the sensor panels 41A and 41B. Further, in the contact members 57A, 58A, and 56B to 58B, the second length L_PD along the plane direction PD is smaller than the first length L_ND along the normal direction ND to the attachment surface 51.

Figure 12:
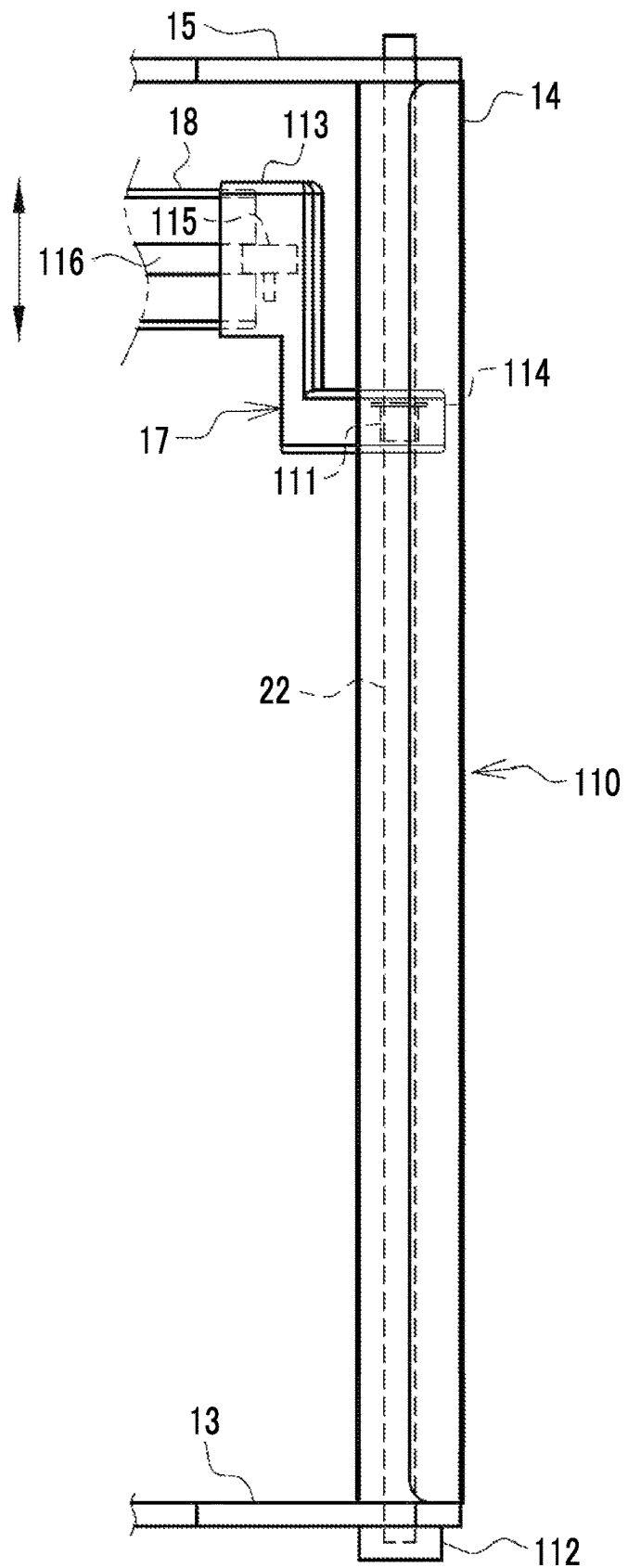
FIG. 12 is a diagram illustrating an elevating mechanism.

For example, as illustrated in FIG. 12, an elevating mechanism 110 that raises and lowers the connection member 17 and thus the frame 18 in the vertical direction is a ball screw mechanism including, for example, the screw shaft 22, a nut 111 that has a ball provided therein and is engaged with the screw shaft 22, an elevating motor 112 that rotates the screw shaft 22. The elevating motor 112 is attached to the rear surface of the stage 13. The height position of the frame 18 is determined from the rotation direction and rotation speed of the elevating motor 112.

The connection member 17 has a first connection portion 113 that is connected to the frame 18 and a second connection portion 114 that is connected to the column 14. The first connection portion 113 protrudes toward the frame 18, and the second connection portion 114 protrudes toward the column 14. The connection member 17 has a Z-shape as a whole. A bearing 115 is provided in the first connection portion 113. The bearing 115 is fitted to a guide groove 116 (see also FIG. 1 and the like) that is formed over the entire circumference of the frame 18. The bearing 115 rolls as the frame 18 is rotated. The nut 111 is provided in the second connection portion 114.

Figure 13:
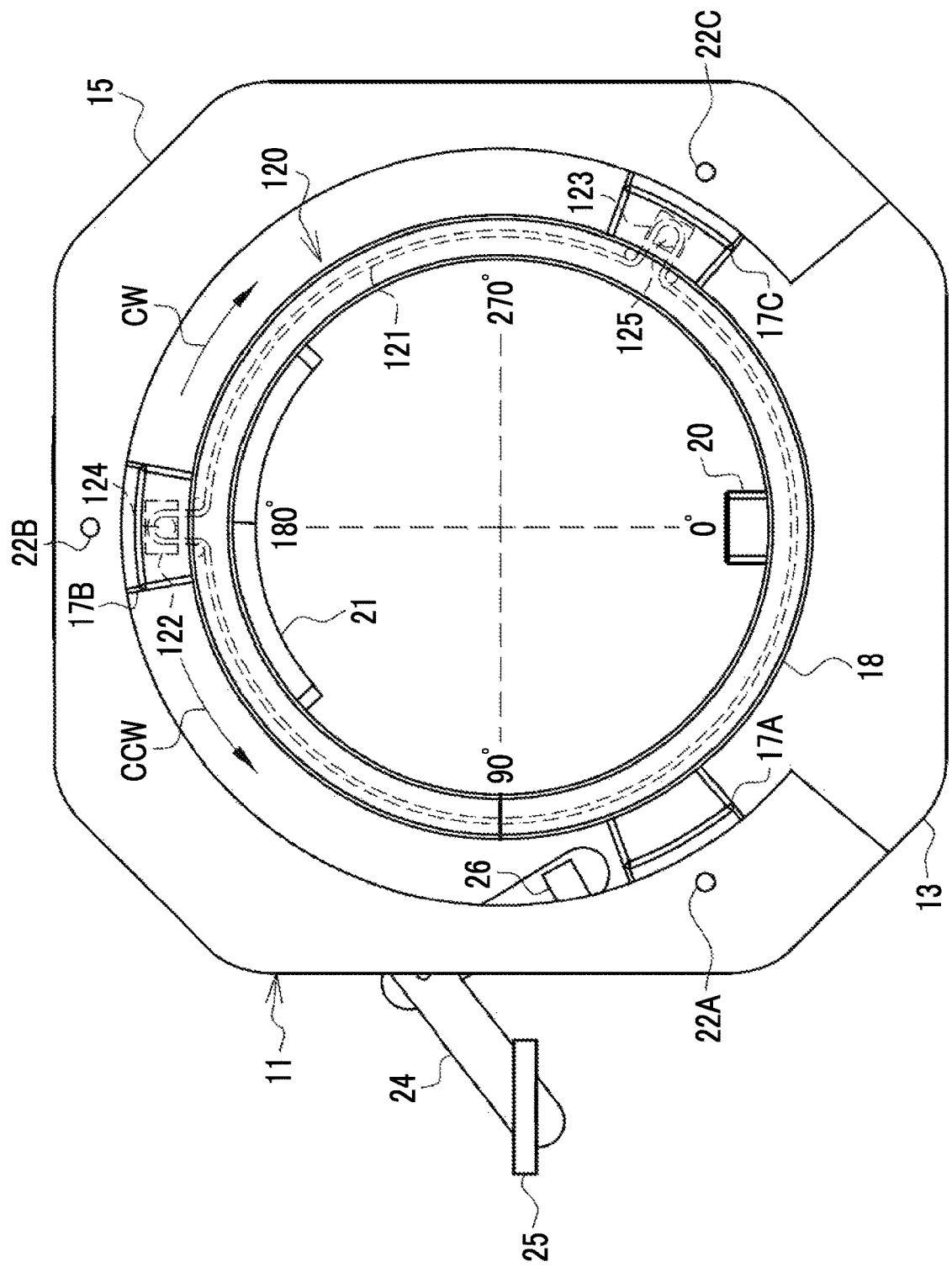
FIG. 13 is a diagram illustrating a rotation mechanism.

For example, as illustrated in FIG. 13, a rotation mechanism 120 that rotates the frame 18 around the subject S includes a rotation belt 121 that is wound around the entire circumference of the frame 18, a rotary motor 122, a potentiometer 123, and the like. The rotary motor 122 is provided in the connection member 17B and is connected to a portion of the rotation belt 121 drawn out from the frame 18 through a pulley 124. The rotary motor 122 is driven to rotate the frame 18 in a clockwise (right-hand rotation) direction CW and a counterclockwise (left-hand rotation) direction CCW. The potentiometer 123 is provided in the connection member 17C and is connected to a portion of the rotation belt 121 drawn out from the frame 18 through the pulley 125. The potentiometer 123 has a variable resistor whose resistance value is changed depending on the rotation position of the frame 18 and outputs a voltage signal corresponding to the rotation position of the frame 18. The rotation position of the frame 18 is determined by the voltage signal from the potentiometer 123.

Figure 14:
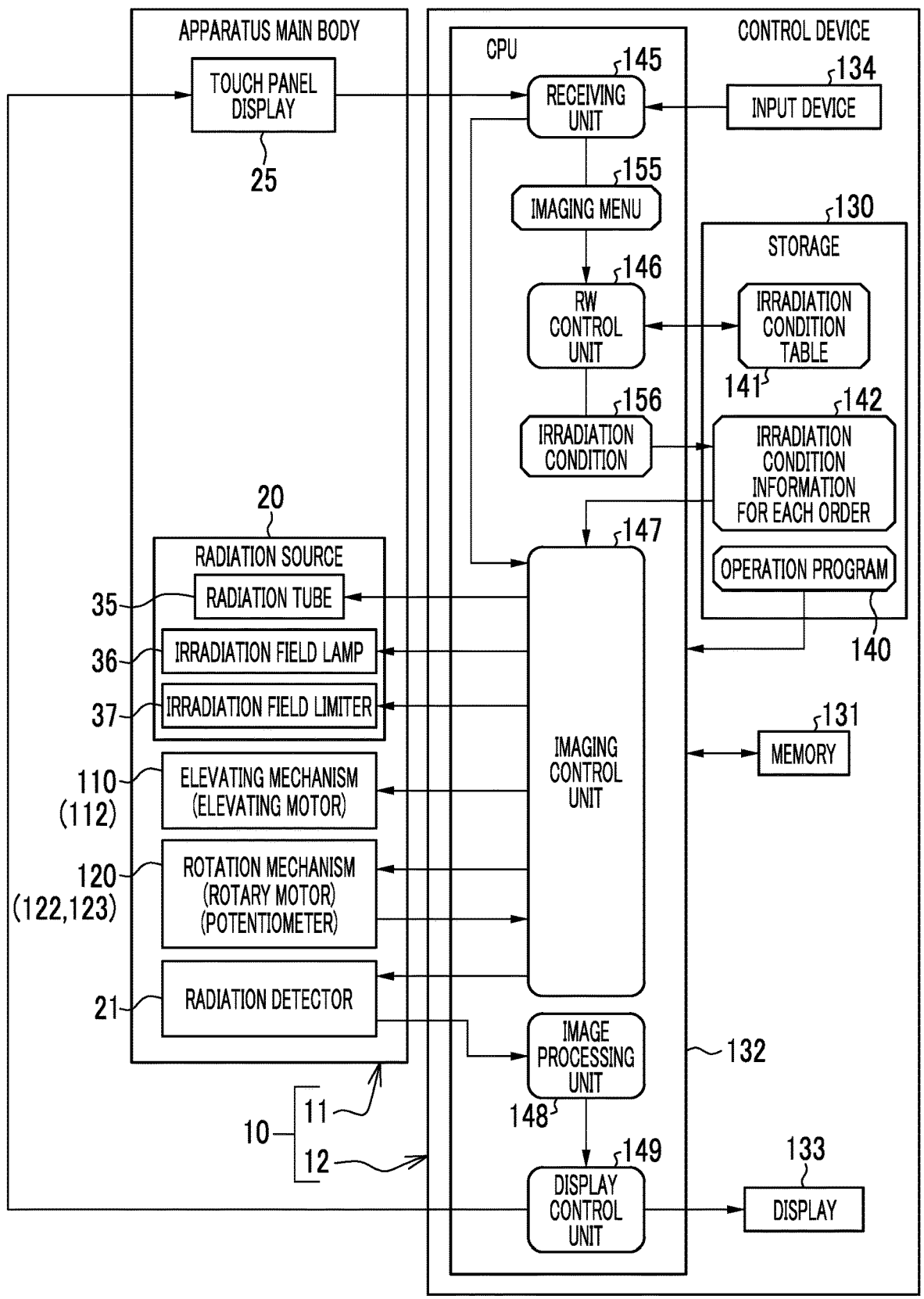
FIG. 14 is a block diagram illustrating a processing unit of a CPU of a control device.

For example, as illustrated in FIG. 14, a computer constituting the control device 12 comprises a storage 130, a memory 131, a central processing unit (CPU) 132, a display 133, an input device 134, and the like.

The storage 130 is a hard disk drive that is provided in the computer constituting the control device 12 or is connected to the computer through a cable or a network. Alternatively, the storage 130 is a disk array in which a plurality of hard disk drives are connected. The storage 130 stores, for example, a control program, such as an operating system, various application programs, and various kinds of data associated with these programs. In addition, a solid state drive may be used instead of the hard disk drive.

The memory 131 is a work memory that is used by the CPU 132 to perform processes. The CPU 132 loads the program stored in the storage 130 to the memory 131 and performs the process corresponding to the program. Therefore, the CPU 132 controls the overall operation of each unit of the computer. In addition, the memory 131 may be provided in the CPU 132.

The display 133 displays various screens. The various screens have operation functions by a graphical user interface (GUI). The computer constituting the control device 12 receives operation instructions input from the input device 134 through various screens. The input device 134 is, for example, a keyboard, a mouse, a touch panel, and a microphone for voice input.

An operation program 140 is stored in the storage 130. The operation program 140 is an application program for causing the computer to function as the control device 12. The storage 130 stores, for example, an irradiation condition table 141 and irradiation condition information 142 for each order, in addition to the operation program 140.

In a case in which the operation program 140 is started, the CPU 132 of the control device 12 functions as a receiving unit 145, a read and write (hereinafter, abbreviated to RW) control unit 146, an imaging control unit 147, an image processing unit 148, and a display control unit 149 in cooperation with, for example, the memory 131.

The receiving unit 145 receives various operation instructions input by the operator through the touch panel display 25 of the apparatus main body 11 and the input device 134. For example, the receiving unit 145 receives an imaging menu 155. The receiving unit 145 outputs the imaging menu 155 to the RW control unit 146.

The RW control unit 146 receives the imaging menu 155 from the receiving unit 145. The RW control unit 146 reads out irradiation conditions 156 of the radiation R which correspond to the received imaging menu 155 from the irradiation condition table 141. The RW control unit 146 writes the irradiation conditions 156 read from the irradiation condition table 141 to the irradiation condition information 142 for each order.

The imaging control unit 147 controls the operation of the radiation source 20 (the radiation tube 35, the irradiation field lamp 36, and the irradiation field limiter 37), the elevating mechanism 110 (elevating motor 112), the rotation mechanism 120 (the rotary motor 122 and the potentiometer 123), and the radiation detector 21. The imaging control unit 147 reads out the irradiation conditions 156 from the irradiation condition information 142 for each order. The imaging control unit 147 drives the irradiation field limiter 37 according to the irradiation conditions 156 to adjust the irradiation field. Further, the imaging control unit 147 drives the radiation tube 35 according to the irradiation conditions 156 such that the radiation R is emitted from the radiation tube 35. The imaging control unit 147 outputs a radiographic image (hereinafter, referred to as a projection image) which has been formed by the emission of the radiation R and detected by the radiation detector 21, from the radiation detector 21 to the image processing unit 148.

The image processing unit 148 acquires the projection image from the radiation detector 21. The image processing unit 148 performs various types of image processing on the projection image. Further, the image processing unit 148 performs a reconstruction process on a plurality of projection images subjected to the image processing to generate a tomographic image TI. The image processing unit 148 outputs the projection image or the tomographic image TI subjected to the image processing to the display control unit 149. In addition, the image processing unit 148 may perform a process of correcting the positional deviation of the pixels 94 caused by the thermal expansion and contraction of the sensor panel 41.

The display control unit 149 controls the display of various kinds of information on the touch panel display 25 and the display 133. The display control unit 149 receives the projection image or the tomographic image TI from the image processing unit 148. The display control unit 149 displays the projection image or the tomographic image TI on the touch panel display 25 and the display 133.

The imaging menu 155 includes, for example, imaging order identification data (ID) and an imaging procedure (see FIG. 15). The imaging order ID is identification information of the imaging order issued by a doctor who performs a medical examination using the tomographic image TI. The imaging procedure includes the posture of the subject S in a standing or sitting position, an imaging part, such as the head, the neck, or the spine, and the attributes of the subject S such as an adult male and an adult female.

The imaging order is transmitted from a radiology information system (RIS) (not illustrated) to the control device 12. The control device 12 displays a list of imaging orders on the display 133 under the control of the display control unit 149. The operator browses the list of imaging orders and checks the content of the list. Then, the control device 12 displays the imaging menu 155 corresponding to the imaging order on the display 133 such that it can be set. The operator operates the input device 134 to select the imaging menu 155 corresponding to the imaging order and to input the imaging menu 155.

For example, as illustrated in FIG. 15, the irradiation conditions 156 are registered in the irradiation condition table 141 for each imaging procedure. The irradiation conditions 156 include a tube voltage and a tube current applied to the radiation tube 35 and the irradiation time of the radiation R. In addition, the irradiation conditions 156 include the size of the irradiation field, which is not illustrated. The operator can finely adjust the irradiation conditions 156 by hand. Further, instead of the tube current and the irradiation time, a tube current-irradiation time product, that is, a so-called mAs value may be set as the irradiation condition 156.

A scout imaging position and a main imaging start position are also registered in the irradiation condition table 141 for each imaging procedure, which is not illustrated. The scout imaging position is a set of the height position and the rotation position of the frame 18 in scout imaging. The height position indicates the height of the frame 18 in a case in which the surface of the stage 13 is 0 cm. The rotation position is, for example, a position where the radiation source 20 faces the subject S, that is, a position of 0°. Alternatively, the rotation position may be a position of 90° where the radiation source 20 faces the right side surface of the subject S or a position of 270° where the radiation source 20 faces the left side surface of the subject S.

Here, the scout imaging is preliminary radiography that is performed to confirm the positioning of the subject S before the main imaging that captures a plurality of projection images at a predetermined angle to generate the tomographic image TI. In the scout imaging, the frame 18 is located at the height position and the rotation position registered in the irradiation condition table 141, and the radiation R is emitted with a lower dose than that in the main imaging to obtain one projection image. Hereinafter, the projection image obtained by the scout imaging is referred to as a scout image SI (see FIG. 16).

The main imaging start position is the rotation start position of the frame 18 in the main imaging. The main imaging start position is, for example, a position of 0°. Alternatively, the main imaging start position may be a position of 90°.

The irradiation conditions 156, the scout imaging position, and the main imaging start position are registered for each imaging order ID in the irradiation condition information 142 for each order, which is not illustrated. The imaging control unit 147 reads out the irradiation conditions 156, the scout imaging position, and the main imaging start position corresponding to the imaging order ID of the next imaging from the irradiation condition information 142 for each order and controls the operation of each unit on the basis of the read-out irradiation condition 156, scout imaging position, and main imaging start position.

In a case in which the subject S is guided into the apparatus main body 11, the frame 18 is moved to a retracted height position by the elevating mechanism 110 and is rotated to a position of 60° by the rotation mechanism 120 under the control of the imaging control unit 147. The retracted height position is set on the upper end side of the column 14. Specifically, the retracted height position is the position of the highest point in the elevation range of the frame 18. In this example, the position of the highest point in the elevation range of the frame 18 is the position of substantially the upper end of the column 14 and is the position where the second connection portion 114 of the connection member 17 comes into contact with the rear surface of the top plate 15. The position of 60° is a position where the entire radiation source 20 overlaps the column 14A. The operator guides the subject S into the apparatus main body 11 in this state through a space between the columns 14A and 14C as an entrance and positions the subject S.

After positioning the subject S in the apparatus main body 11, the operator stays at the installation position of the apparatus main body 11 and operates the touch panel display 25 to move the frame 18 to the height position registered in the irradiation condition table 141 and to rotate the frame 18 to the position of 0°. Then, the operator operates the touch panel display 25 to turn on the irradiation field lamp 36 and to irradiate the irradiation field with visible light, in order to confirm the irradiation field of the radiation R.

The operator visually recognizes the visible light from the irradiation field lamp 36 and determines whether the height position of the frame 18 and the positioning of the subject S are appropriate for imaging. In a case in which it is determined that the height position of the frame 18 and the positioning of the subject S are not appropriate for imaging, the operator operates the touch panel display 25 to adjust the height position of the frame 18 or to reposition the subject S. In a case in which it is determined that the height position of the frame 18 and the positioning of the subject S are appropriate for imaging, the operator operates the touch panel display 25 to turn off the irradiation field lamp 36.

Figure 16:
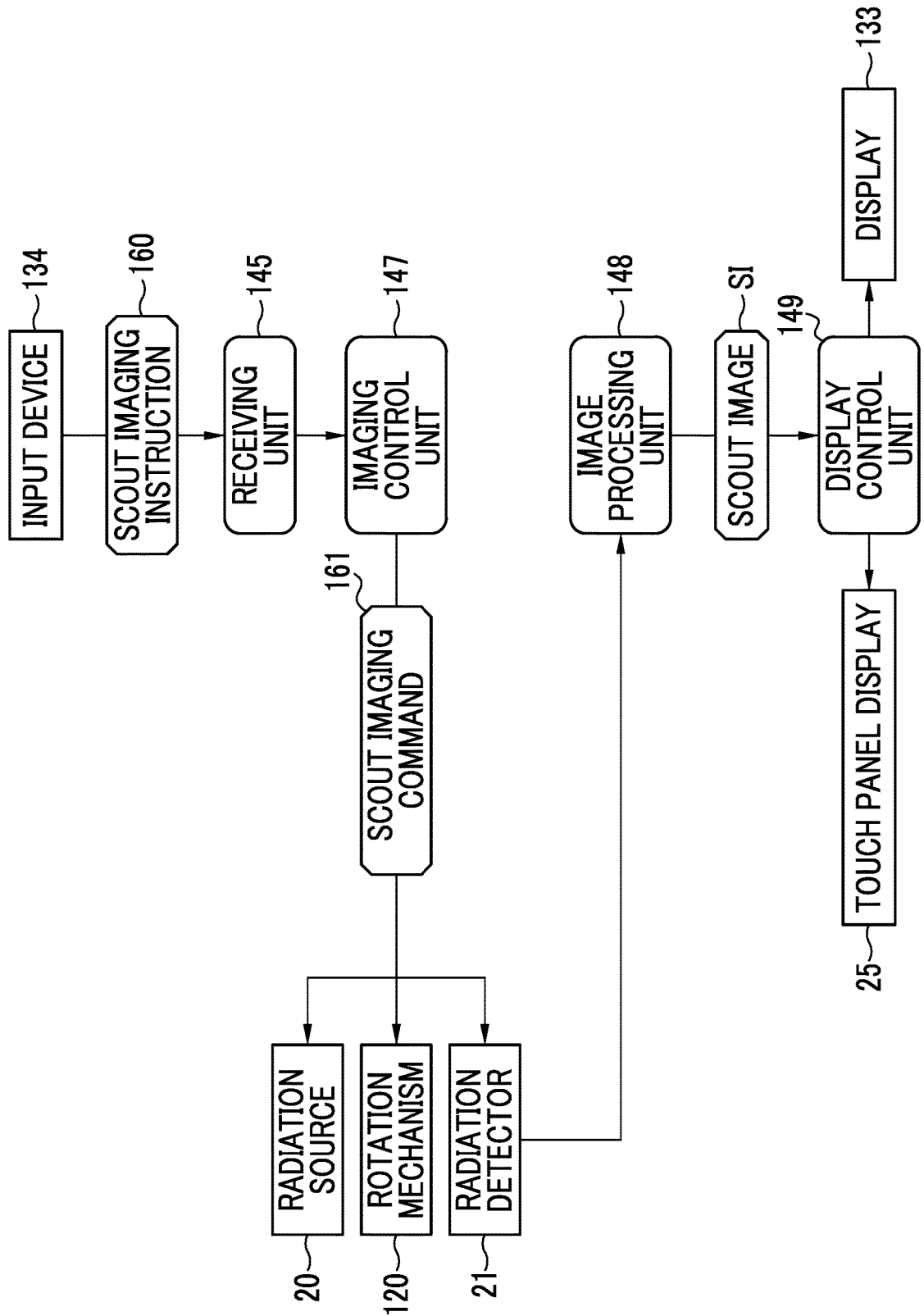
FIG. 16 is a diagram illustrating an outline of a process in a case in which a scout imaging instruction for performing scout imaging is input.

For example, as illustrated in FIG. 16, after confirming the irradiation field of the radiation R, the operator moves to the installation position of the control device 12 and operates the input device 134 to input a scout imaging instruction 160 for performing the scout imaging. The receiving unit 145 receives the scout imaging instruction 160 and outputs the instruction to the imaging control unit 147. The imaging control unit 147 outputs a scout imaging command 161 corresponding to the scout imaging instruction 160 to the radiation source 20, the radiation detector 21, and the rotation mechanism 120.

The content of the scout imaging command 161 is that the height position at the time of confirming the irradiation field of the radiation R is maintained and the frame 18 is rotated to the rotation position which is the scout imaging position registered in the irradiation condition table 141. Further, the content of the scout imaging command 161 is that the scout imaging is performed at the height position at the time of confirming the irradiation field of the radiation R and the rotation position which is the scout imaging position registered in the irradiation condition table 141. The rotation mechanism 120 drives the rotary motor 122 to rotate the rotation belt 121, thereby rotating the frame 18 to the rotation position which is the scout imaging position registered in the irradiation condition table 141.

The radiation source 20 drives the radiation tube 35 to irradiate the subject S with the radiation R for scout imaging. The radiation detector 21 detects the radiation R transmitted through the subject S to obtain the projection image. The radiation detector 21 outputs the projection image to the image processing unit 148.

The image processing unit 148 performs various types of image processing on the projection image from the radiation detector 21 to obtain the scout image SI. The image processing unit 148 outputs the scout image SI to the display control unit 149. The display control unit 149 displays the scout image SI on the touch panel display 25 and the display 133.

The operator browses the scout image SI on the display 133 and determines whether the height position of the frame 18 and the positioning of the subject S are appropriate for imaging. In a case in which it is determined that the height position of the frame 18 and the positioning of the subject S are not appropriate for imaging from the scout image SI, the operator returns to the installation position of the apparatus main body 11 and turns on the irradiation field lamp 36 again to adjust the height position of the frame 18 or to reposition the subject S.

Figure 17:
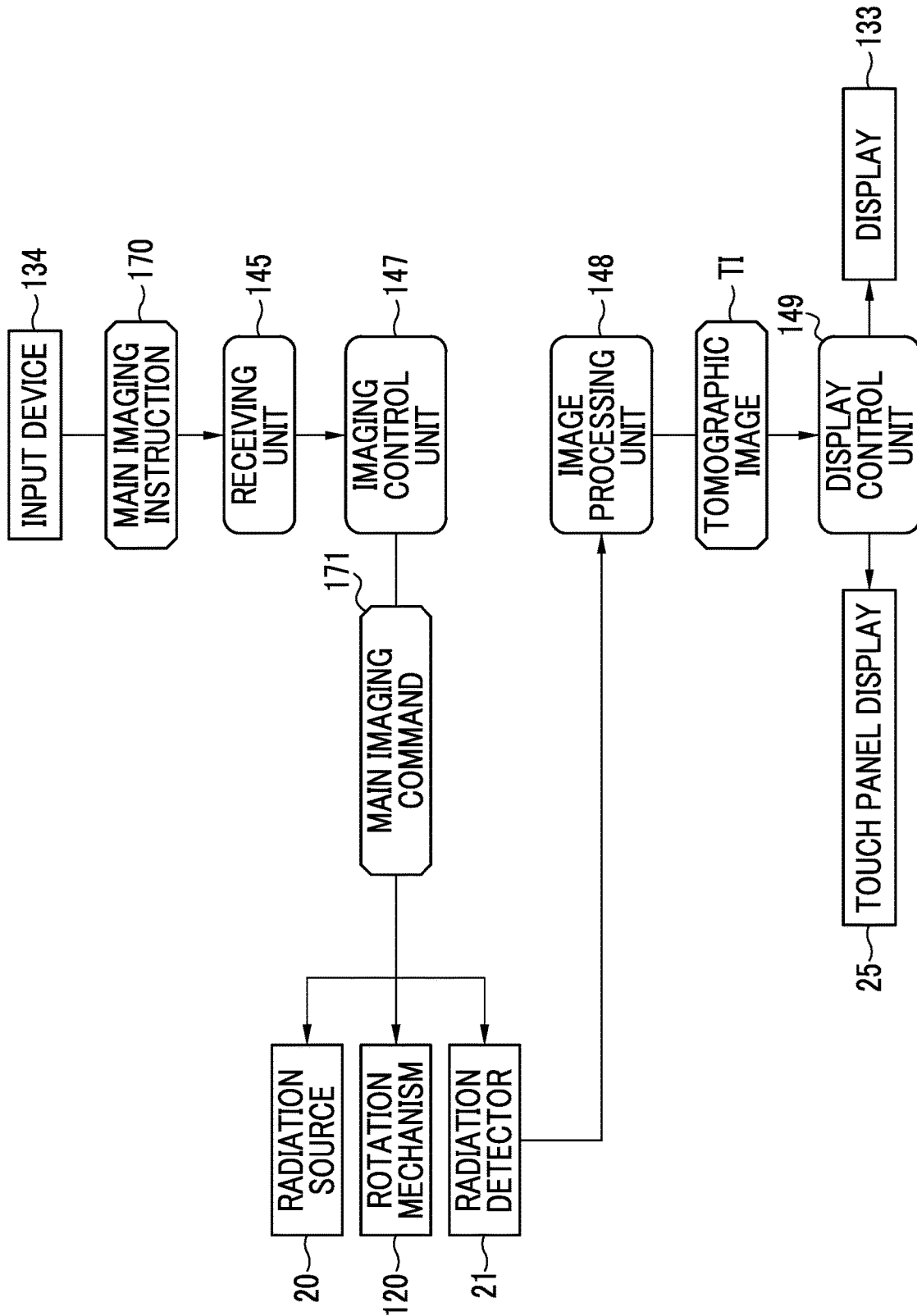
FIG. 17 is a diagram illustrating an outline of a process in a case in which a main imaging instruction for performing main imaging is input.

For example, as illustrated in FIG. 17, in a case in which it is determined that the height position of the frame 18 and the positioning of the subject S are appropriate for imaging from the scout image SI, the operator operates the input device 134 to input a main imaging instruction 170 for performing the main imaging. The receiving unit 145 receives the main imaging instruction 170 and outputs the instruction to the imaging control unit 147. The imaging control unit 147 outputs a main imaging command 171 corresponding to the main imaging instruction 170 to the radiation source 20, the radiation detector 21, and the rotation mechanism 120.

The content of the main imaging command 171 is that the height position at the time of the end of the scout imaging is maintained and the frame 18 is rotated to the main imaging start position and is then rotated to a main imaging end position in the counterclockwise direction CCW. Further, the content of the main imaging command 171 is that the main imaging is performed while the frame 18 is rotated from the main imaging start position to the main imaging end position. The rotation mechanism 120 drives the rotary motor 122 to rotate the rotation belt 121 such that the frame 18 is first rotated to the main imaging start position. Then, the rotation mechanism 120 rotates the frame 18 to the main imaging end position in the counterclockwise direction CCW. In this example, the main imaging end position is a position that is rotated by 225° in the counterclockwise direction CCW from the main imaging start position. In a case in which the main imaging start position is a position of 0°, the main imaging end position is a position of 135° that is rotated by 225° in the counterclockwise direction CCW from the position of 0°. Further, in a case in which the main imaging start position is 90°, the main imaging end position is a position of 225°. In a case in which the main imaging start position is 180°, the main imaging end position is a position of 315°.

The radiation source 20 drives the radiation tube 35 at a predetermined angle to irradiate the subject S with the radiation R for main imaging according to the irradiation conditions 156 at a predetermined angle. The radiation detector 21 detects the radiation R transmitted through the subject S at a predetermined angle to obtain a plurality of projection images. The radiation detector 21 sequentially outputs the plurality of projection images to the image processing unit 148.

The image processing unit 148 performs a reconstruction process on the plurality of projection images from the radiation detector 21 to obtain the tomographic image TI. The image processing unit 148 outputs the tomographic image TI to the display control unit 149. The display control unit 149 displays the tomographic image TI on the touch panel display 25 and the display 133.

The operator browses the tomographic image TI on the display 133 and determines whether or not the tomographic image TI needs to be re-captured. In a case in which it is determined that the tomographic image TI needs to be re-captured, the operator operates the input device 134 to re-input the main imaging instruction 170.

In a case in which it is determined that the tomographic image TI does not need to be re-captured, the operator operates the input device 134 to return the frame 18 to the retracted height position. Further, the frame 18 is rotated in the clockwise direction CW from the imaging end position and is returned to the position of 60°. Then, the operator retracts the subject S from the inside of the apparatus main body 11.

Figure 18:
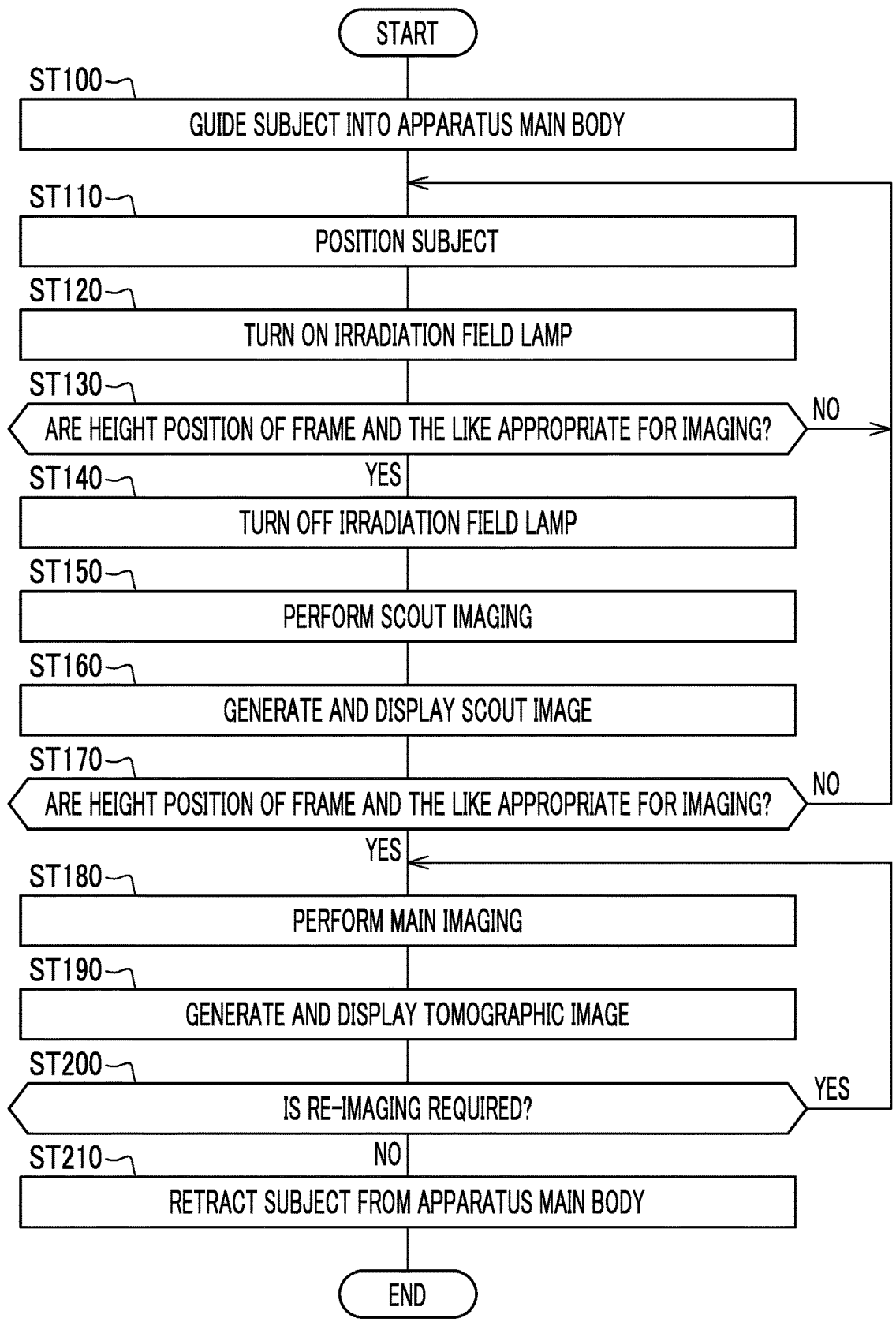
FIG. 18 is a flowchart illustrating a procedure of capturing a tomographic image by the CT apparatus.

Next, the operation of the above-mentioned configuration will be described with reference to a flowchart illustrated in FIG. 18. In a case in which the operation program 140 is started, the CPU 132 of the control device 12 functions as the receiving unit 145, the RW control unit 146, the imaging control unit 147, the image processing unit 148, and the display control unit 149 as illustrated in FIG. 14.

First, in a state in which the frame 18 is moved to the retracted height position and is rotated to the position of 60°, the operator guides the subject S into the apparatus main body 11 (Step ST100). Then, the operator positions the subject S (Step ST110).

After positioning the subject S, the operator inputs an instruction to turn on the irradiation field lamp 36 through the touch panel display 25. Then, the elevating mechanism 110 is operated to move the frame 18 to the height position registered in the irradiation condition table 141. Further, the rotation mechanism 120 is operated to rotate the frame 18 to the position of 0°. Further, after the irradiation field limiter 37 is driven and adjusted to the irradiation field corresponding to the irradiation conditions 156, the irradiation field lamp 36 is turned on, and the irradiation field is irradiated with visible light (Step ST120).

The operator determines whether or not the height position of the frame 18 and the positioning of the subject S are appropriate for imaging with reference to the visible light from the irradiation field lamp 36 (Step ST130). In a case in which the height position of the frame 18 and the positioning of the subject S are not appropriate for imaging (NO in Step ST130), the operator adjusts the height position of the frame 18 or repositions the subject S. In a case in which the height position of the frame 18 and the positioning of the subject S are appropriate for imaging (YES in Step ST130), the operator inputs an instruction to turn off the irradiation field lamp 36 through the touch panel display 25, and the irradiation field lamp 36 is turned off (Step ST140).

As illustrated in FIG. 16, after confirming the irradiation field of the radiation R, the operator inputs the scout imaging instruction 160 through the input device 134. The receiving unit 145 receives the scout imaging instruction 160. Then, the scout imaging command 161 is output from the imaging control unit 147 to, for example, the radiation source 20.

The rotation mechanism 120 is operated by the scout imaging command 161 to rotate the frame 18 to the rotation position registered in the irradiation condition table 141. Further, the radiation tube 35 irradiates the subject S with the radiation R for scout imaging, and the radiation detector 21 detects the radiation R transmitted through the subject S to obtain the projection image (Step ST150).

The image processing unit 148 performs various types of image processing on the projection image obtained by the radiation detector 21 to obtain the scout image SI. The scout image SI is displayed on the touch panel display 25 and the display 133 under the control of the display control unit 149 (Step ST160).

The operator determines whether or not the height position of the frame 18 and the positioning of the subject S are appropriate for imaging again with reference to the scout image SI (Step ST170). In a case in which the height position of the frame 18 and the positioning of the subject S are not appropriate for imaging (NO in Step ST170), the operator adjusts the height position of the frame 18 or repositions the subject S.

In a case in which the height position of the frame 18 and the positioning of the subject S are appropriate for imaging (YES in Step ST170), the operator inputs the main imaging instruction 170 through the input device 134 as illustrated in FIG. 17. The receiving unit 145 receives the main imaging instruction 170. Then, the main imaging command 171 is output from the imaging control unit 147 to, for example, the radiation source 20.

The rotation mechanism 120 is operated in response to the main imaging command 171 to first rotate the frame 18 to the main imaging start position. Then, the frame 18 is rotated to the main imaging end position in the counterclockwise direction CCW. During that time, the radiation tube 35 irradiates the subject S with the radiation R for main imaging at a predetermined angle, and the radiation detector 21 detects the radiation R transmitted through the subject S whenever the subject S is irradiated to obtain a plurality of projection images (Step ST180).

The image processing unit 148 performs the reconstruction process on the plurality of projection images obtained by the radiation detector 21 to obtain the tomographic image TI. The tomographic image TI is displayed on the touch panel display 25 and the display 133 under the control of the display control unit 149 (Step ST190).

The operator determines whether or not the tomographic image TI needs to be re-captured (Step ST200). In a case in which the operator determines that the tomographic image TI needs to be re-captured (YES in Step ST200), the operator inputs the main imaging instruction 170 through the input device 134, and the process returns to Step ST180.

In a case in which the operator determines that the tomographic image TI does not need to be re-captured, the elevating mechanism 110 is operated in response to an instruction from the operator through the input device 134 to return the frame 18 to the retracted height position. Further, the rotation mechanism 120 is operated to return the frame 18 from the imaging end position to the position of 60° in the clockwise direction CW. After the frame 18 is returned to the retracted height position and the position of 60°, the operator retracts the subject S from the apparatus main body 11 (Step ST210). The series of Steps ST100 to ST210 is repeated in a case in which there is the next imaging order.

As illustrated in FIG. 8 and the like, the radiation detector 21 comprises the support table 50, the sensor panel 41, the fixing members 53 and 54, and the contact members 56 to 58. The attachment surface 51 having an arc surface shape is formed in the support table 50. The sensor panel 41 has the imaging region 100 in which a plurality of pixels 94 detecting the radiation R are two-dimensionally arranged. In the sensor panel 41, the first surface 52 is attached to the attachment surface 51 following the arc surface shape. The fixing members 53 and 54 partially fix the first surface 52 to the attachment surface 51. The contact members 56 to 58 come into contact with the second surface 55 of the sensor panel 41 which is opposite to the first surface 52 to suppress the lifting of the sensor panel 41 from the support table 50.

In a case in which the entire first surface 52 of the sensor panel 41 is fixed to the attachment surface 51, there is a high possibility that wrinkles caused by thermal expansion and contraction will occur in the sensor panel 41. However, since the first surface 52 is partially fixed to the attachment surface 51 by the fixing members 53 and 54, the possibility is very low. In addition, since the contact members 56 to 58 are present, there is a very low possibility that the end portion of the sensor panel 41 will be lifted from the support table 50 because of the difference between the thermal expansion coefficients of the sensor panel 41 and the support table 50. Therefore, it is possible to stably hold the sensor panel 41. Since the sensor panel 41 has a relatively large area, it is possible to eliminate the adverse effect of heat which is a major problem.

The fixing members 53 and 54 preserve the positional relationship between the sensor panel 41 and the support table 50. Therefore, even in a case in which the sensor panel 41 is thermally expanded or contracted, the position of the sensor panel 41 does not deviate significantly, and the sensor panel 41 can return to the position before the thermal expansion or the thermal contraction with good reproducibility.

As illustrated in FIG. 9, the contact members 56 to 58 bias the sensor panel 41 to the attachment surface 51. Therefore, it is possible to further reduce the possibility that the end portion of the sensor panel 41 will be lifted from the support table 50.

As illustrated in FIG. 8 and the like, the sensor panel 41 is fixed to the attachment surface 51 by the fixing member 53 at least in the central portion CP of the first surface 52. Therefore, it is possible to improve the balance of the fixing force as compared to a case in which the sensor panel is fixed, for example, at a biased position of the end portion.

As illustrated in FIG. 8 and the like, the positions fixed by the fixing members 53 and 54 are arranged at equal intervals. Therefore, it is possible to improve the balance of the fixing force as compared to a case in which the fixed positions are arranged at irregular intervals.

Further, the sizes of the regions fixed by the fixing members 53 and 54 are equal to each other. Therefore, it is possible to improve the balance of the fixing force as compared to a case in which the sizes of the fixed regions by a plurality of fixing members are different from each other.

The fixed regions by the fixing members 53 and 54 have a square shape (regular polygonal shape). Therefore, it is possible to improve the balance of the fixing force as compared to a case in which the fixed region does not have a regular polygonal shape, for example, a case in which the fixed region has a rectangular shape.

As illustrated in FIG. 11, the contact members 56 to 58 are deformed according to the thermal expansion and contraction of the sensor panel 41 in the plane direction PD. The contact members 56 to 58 are deformed in this way to allow the thermal expansion and thermal contraction of the sensor panel 41 in the plane direction PD, which makes it possible to further reduce the possibility that wrinkles caused by thermal expansion and thermal contraction will occur in the sensor panel 41.

In the contact members 56 to 58, the second length L_PD along the plane direction PD is smaller than the first length L_ND along the normal direction ND. Therefore, as compared to a case in which the length L_ND is equal to or less than the length L_PD, the contact members 56 to 58 are more likely to be deformed according to the thermal expansion and contraction of the sensor panel 41 in the plane direction PD.

As illustrated in FIG. 9, in the contact members 56 and 57, the contact surfaces 59 and 60 with the second surface 55 have a shape following the arc surface shape. Therefore, the contact condition of the contact members 56 and 57 with the second surface 55 does not change depending on the location, and it is possible to prevent the sensor panel 41 from being subjected to extra stress.

The holding members 65 to 67 that hold the contact members 56 to 58 and have a higher rigidity than the contact members 56 to 58 are provided. Therefore, it is possible to stably maintain the biasing force for biasing the sensor panel 41 to the attachment surface 51.

As illustrated in FIG. 10, the contact members 56 to 58 come into contact with the non-imaging region 101. Therefore, the contact members 56 to 58 are not reflected in the projection image and thus the tomographic image TI, which makes it possible to prevent the deterioration of the quality of the tomographic image TI.

As illustrated in FIG. 10, the contact members include the contact members 56A and 57B that are disposed on the sides 42A and 43B to which the reading circuit boards 45A and 45B are attached and the contact members 57A and 56B that are disposed on the sides 43A and 42B which face the sides 42A and 43B and to which the reading circuit boards 45A and 45B are not attached. In addition, the contact members 56A and 57B have a higher biasing force than the contact members 57A and 56B. The end portions on the sides 42A and 43B have a strong repulsive force since the reading circuit boards 45A and 45B are attached to the end portions and are likely to be lifted. However, the biasing force of the contact members 56A and 57B can be increased to more firmly suppress the lifting of the end portions on the sides 42A and 43B.

The radiation shielding members 83 and 84 that shield the radiation R to protect the reading circuit board 45 and the switching circuit board 47 are attached to the contact members 56 and 58. Therefore, it is possible to prevent the performance of the reading circuit board 45 and the switching circuit board 47 from being deteriorated by the radiation R.

As illustrated in FIG. 9, the thickness TH of the substrate 90 of the sensor panel 41 is equal to or less than 100 μm. Therefore, wrinkles caused by thermal expansion and contraction are likely to occur, as compared to a case in which the thickness TH is greater than 100 μm. In addition, the end portion of the sensor panel 41 is likely to be lifted from the support table 50. That is, it is more difficult to stably hold the sensor panel 41. Therefore, it is possible to further exert the effect of the technology of the present disclosure that the sensor panel can be stably held.

As illustrated in FIG. 9, the support table 50 is made of metal, and the substrate 90 of the sensor panel 41 is made of a resin. Therefore, the difference between the thermal expansion coefficients of the sensor panel 41 and the support table 50 is larger, and wrinkles caused by thermal expansion and contraction are likely to occur. In addition, the end portion of the sensor panel 41 is likely to be lifted from the support table 50. That is, it is more difficult to stably hold the sensor panel 41. Therefore, it is possible to further exert the effect of the technology of the present disclosure that the sensor panel can be stably held.

Two sensor panels 41, that is, the sensor panels 41A and 41B are provided. Therefore, it is possible to image a wider range of the subject S at one time as compared to a case in which one sensor panel 41 is provided.

The CT apparatus 10 comprises the radiation detector 21 and the radiation source 20 that emits the radiation R. Since the sensor panel 41 of the radiation detector 21 is stably held, it is possible to obtain the tomographic image TI with little quality deterioration as a result.

Figure 19:
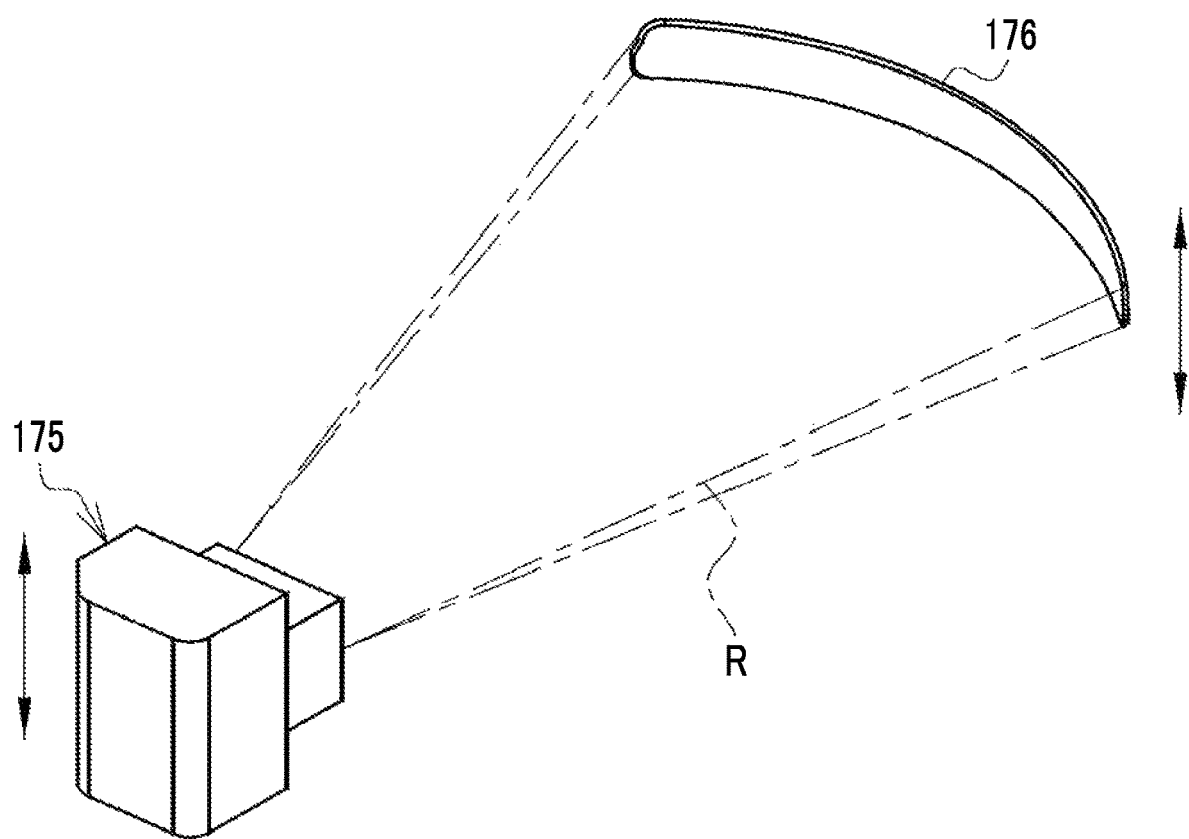
FIG. 19 is a diagram illustrating a radiation source and a radiation detector of a CT apparatus according to the related art.

For example, as illustrated in FIG. 19, the typical CT apparatus according to the related art described in JP6858317B and the like has a configuration in which a radiation source 175 emits fan-shaped radiation R to scan the subject in the height direction (the body axis direction of the subject S) and a radiation detector 176 including a strip-shaped CMOS solid-state imaging element that is curved in an arc shape detects the radiation R while being moved. The CMOS solid-state imaging element has a strip shape in which the length in the height direction is small and has a small area. Therefore, the CMOS solid-state imaging element is more easily held stably than the sensor panel 41 having a relatively large area. However, it takes a long imaging time to perform scanning with the radiation R. Further, in a case in which a plurality of CMOS solid-state imaging elements are arranged to form a radiation detector having a large area as a whole as in JP6858317B in order to shorten the imaging time, there is a concern that the quality of the tomographic image TI will deteriorate due to the joints of each CMOS solid-state imaging element.

In contrast, as illustrated in, for example, FIGS. 6 and 7, the CT apparatus 10 uses the sensor panel 41 having a relatively large area in order to eliminate the need for scanning with the radiation R and to minimize the deterioration of the quality of the tomographic image TI caused by the joint. In addition, an attachment method is devised to stably hold the sensor panel 41 which is difficult to hold stably because of its large area. Therefore, it is possible to shorten the imaging time as compared to the CT apparatus according to the related art which performs scanning with the radiation R. In addition, it is possible to suppress the deterioration of the quality of the tomographic image TI as compared to the CT apparatus according to the related art in which a plurality of CMOS solid-state imaging elements are arranged.

The CT apparatus 10 comprises the annular frame 18 to which the radiation source 20 and the radiation detector 21 are attached and the rotation mechanism 120. The subject S is positioned in the cavity 19 of the frame 18. The rotation mechanism 120 rotates the frame 18 around the subject S in order to capture the projection images of the subject S at different angles. The sensor panel 41 has an arc surface shape following the annular frame 18.

Figure 20:
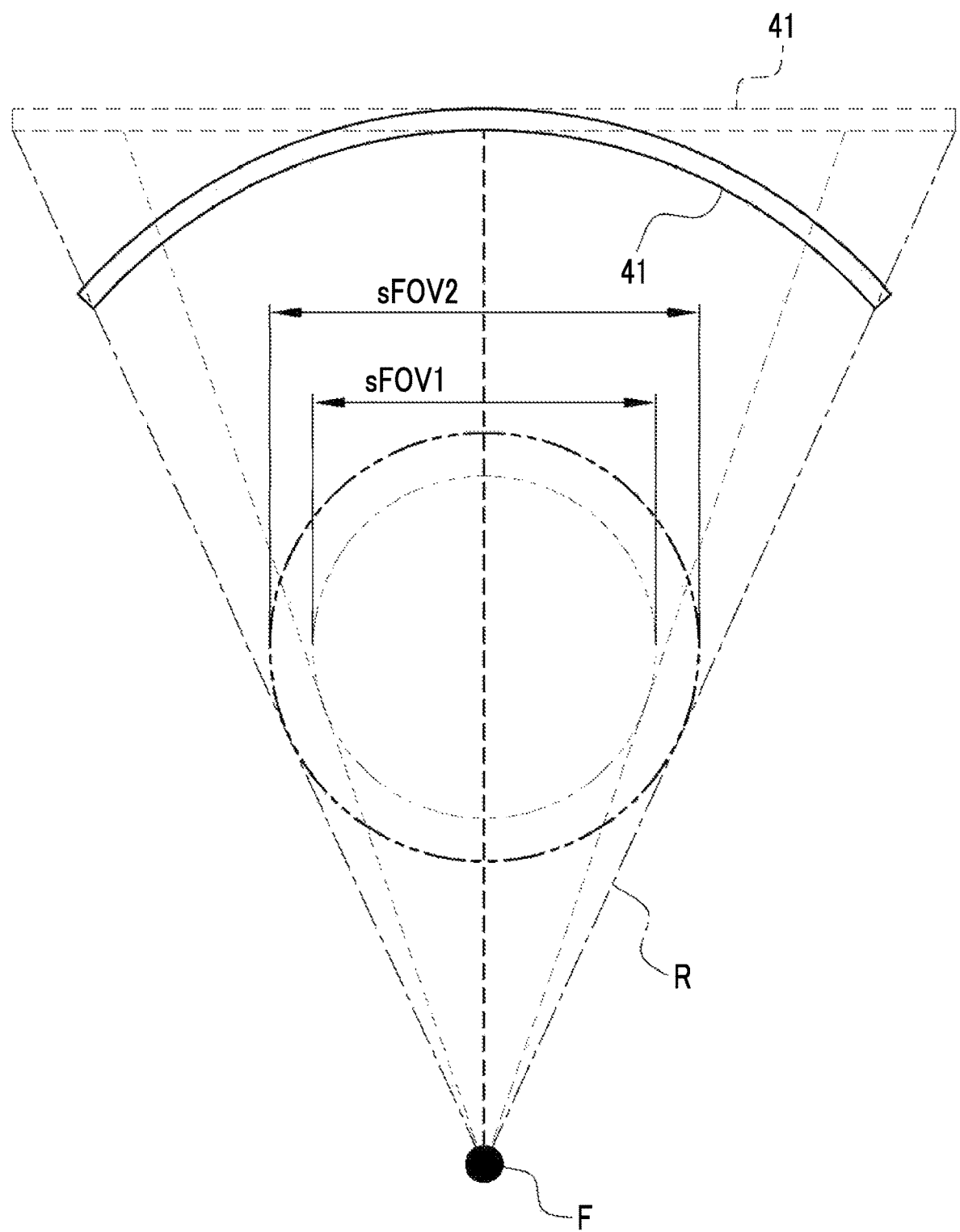
FIG. 20 is a diagram illustrating a scan field of view in a case in which the sensor panel has an arc surface shape and in a case in which the sensor panel has a planar shape.

For example, in a case in which the sensor panel 41 has a planar shape, as represented by a broken line in FIG. 20, the irradiation dose of the radiation R in an end portion is lower than that in a central portion of the sensor panel 41. As a result, a scan field of view (sFOV) 1, which is an imaging range that can be reconstructed as the tomographic image TI, is reduced. On the other hand, in a case in which the sensor panel 41 has an arc surface shape as in this example, the entire sensor panel 41 is irradiated with substantially the same amount of radiation R. Therefore, a scan field of view sFOV2 can be larger than the scan field of view sFOV1 (sFOV2>SFOV1). For example, while sFOV1 is 384 mm, sFOV2 is 406 mm. Therefore, the sensor panel 41 having an arc surface shape makes it possible to image a wider range of the subject S at one time.

In this example, the radiography apparatus is the CT apparatus 10 that obtains the tomographic image TI of the subject S on the basis of the projection images captured at different angles. In a case in which the sensor panel 41 is not stably held, a large deviation occurs in each of the projection images captured at different angles. As a result, there is a concern that the quality of the tomographic image TI will deteriorate significantly. However, in this example, since the sensor panel 41 is stably held, it is possible to reduce the concern that the quality of the tomographic image TI will deteriorate.

As illustrated in FIG. 6, the radiation source 20 emits the radiation R with a quadrangular pyramid shape. Therefore, it is possible to complete imaging in a short time as compared to a case in which the radiation source emits the radiation R with a fan shape to perform scanning in the height direction. In addition, the radiation R having a conical shape instead of the quadrangular pyramid shape may be emitted.

As illustrated in FIGS. 1 and 5, the subject S is positioned in the cavity 19 in either the standing posture or the sitting posture. Therefore, it is possible to meet the doctor's desire to observe soft tissues, such as the lungs, in a natural state in which gravity is applied or to observe joints, such as hip joints, in a state in which gravity is applied and a load is applied.

For example, the fixed position of the sensor panel 41 by the fixing member may be as illustrated in FIGS. 21 to 24. First, in FIG. 21, the fixing member 53A is provided only at the position of the central portion CPA of the first surface 52A.

Figure 22:
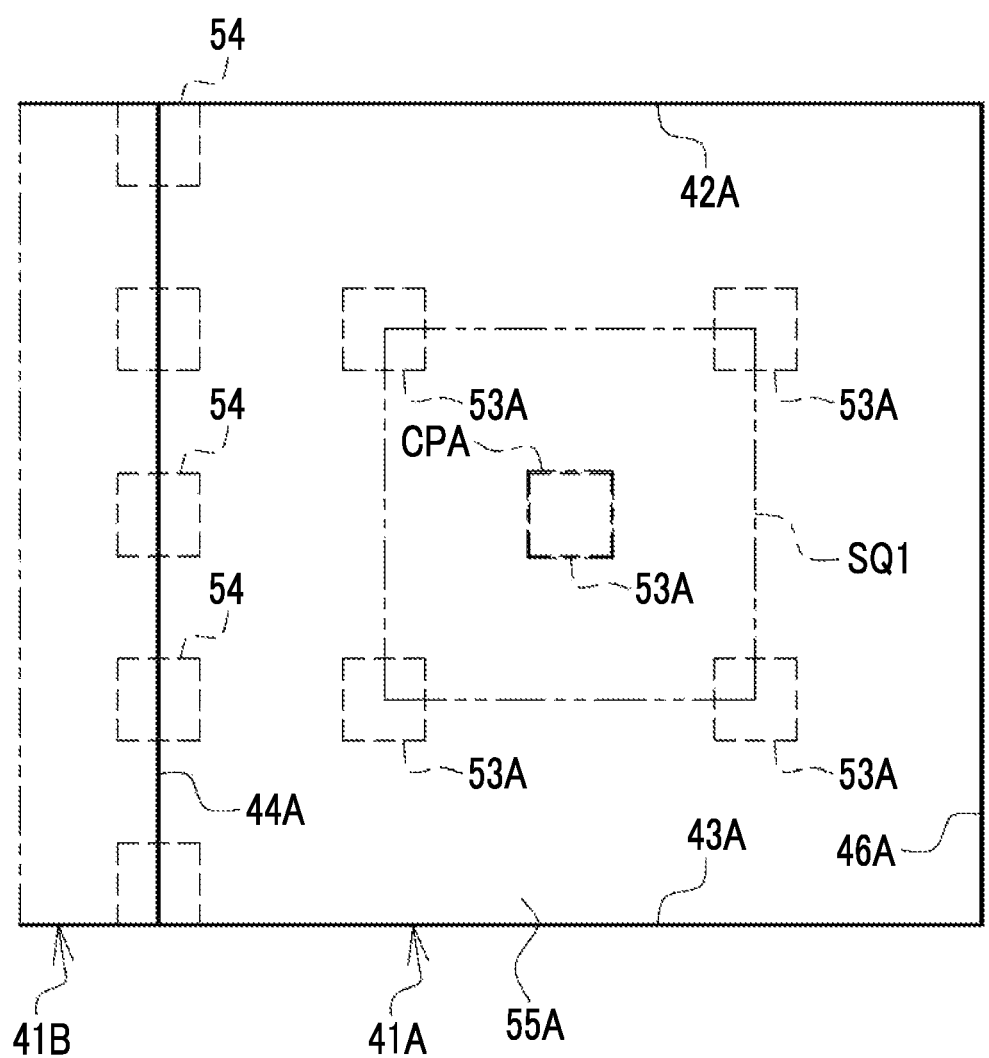
FIG. 22 is a diagram illustrating still another example of the position fixed by the fixing member.

In FIG. 22, the fixing members 53A are provided at symmetrical positions around the central portion CPA in addition to the central portion CPA of the first surface 52A. Specifically, the fixing members 53A are provided at four corners of a square SQ1 having a size that is about half of the size of the sensor panel 41A. The center of the square SQ1 is aligned with the center of the sensor panel 41A. Further, each side of the square SQ1 is parallel to each of the sides 42A to 44A and 46A of the sensor panel 41A. Therefore, the positions fixed by the fixing member 53A are equidistant from the central portion CPA and are at 45° with respect to the central portion CPA in the upper right direction, the upper left direction, the lower right direction, and the lower left direction. The positions fixed by the fixing members 53A provided at the four corners of the square SQ1 are arranged at equal intervals. Furthermore, the term "symmetrical" in the "symmetrical positions" indicates "symmetrical" including an error (for example, an error of about 1% to 10%) that is generally allowed in the technical field to which the technology of the present disclosure belongs and does not depart from the gist of the technology of the present disclosure, in addition to perfect "symmetrical".

Figure 23:
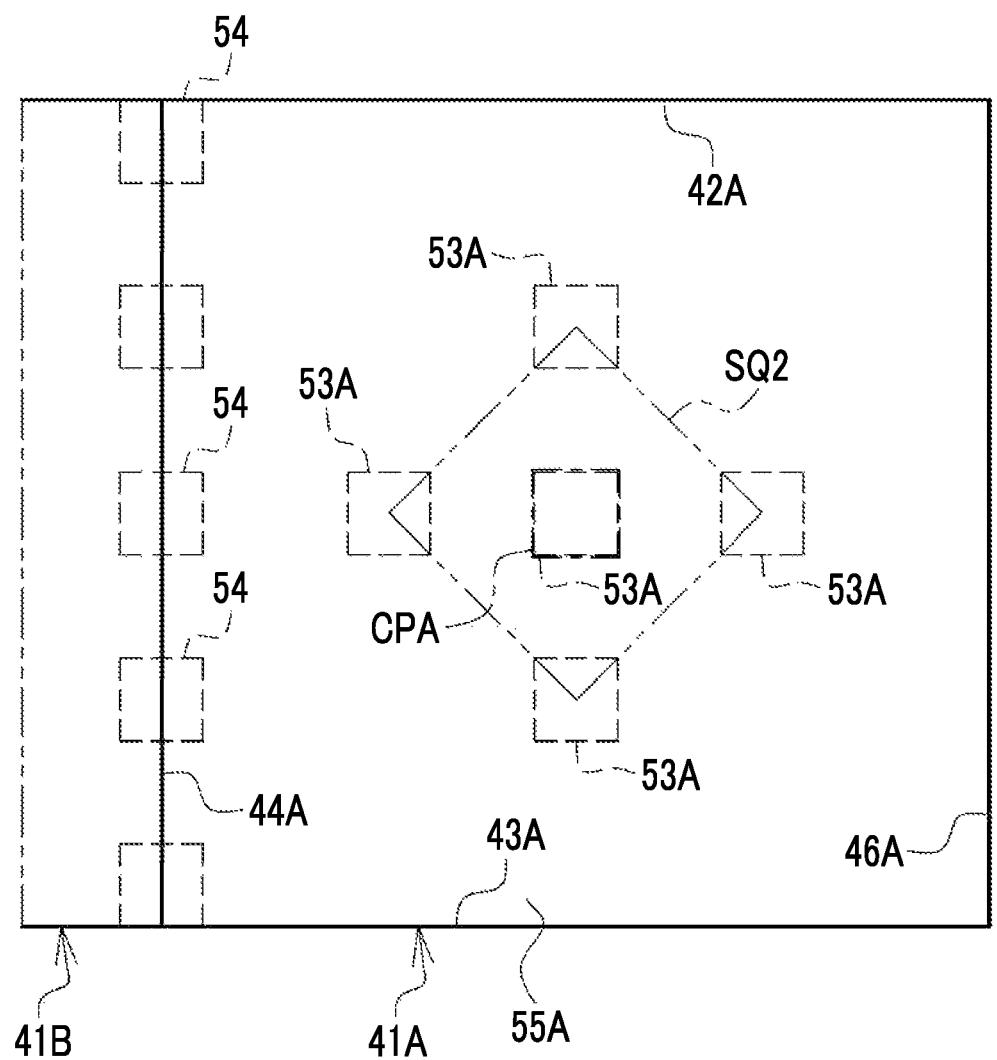
FIG. 23 is a diagram illustrating yet another example of the position fixed by the fixing member.

In FIG. 23, the fixing members 53A are provided at four corners of a square SQ2 having a size of about one third of the size of the sensor panel 41A. The center of the square SQ2 is aligned with the center of the sensor panel 41A. Further, the square SQ2 is rotated by 45°, and each side of the square SQ2 forms an angle of 45° with respect to each of the sides 42A to 44A and 46A of the sensor panel 41A. Therefore, the positions fixed by the fixing members 53A are equidistant from the central portion CPA and are on the upper, lower, right, and left sides of the central portion CPA. The positions fixed by the fixing members 53A provided at the four corners of the square SQ2 are arranged at equal intervals.

Figure 24:
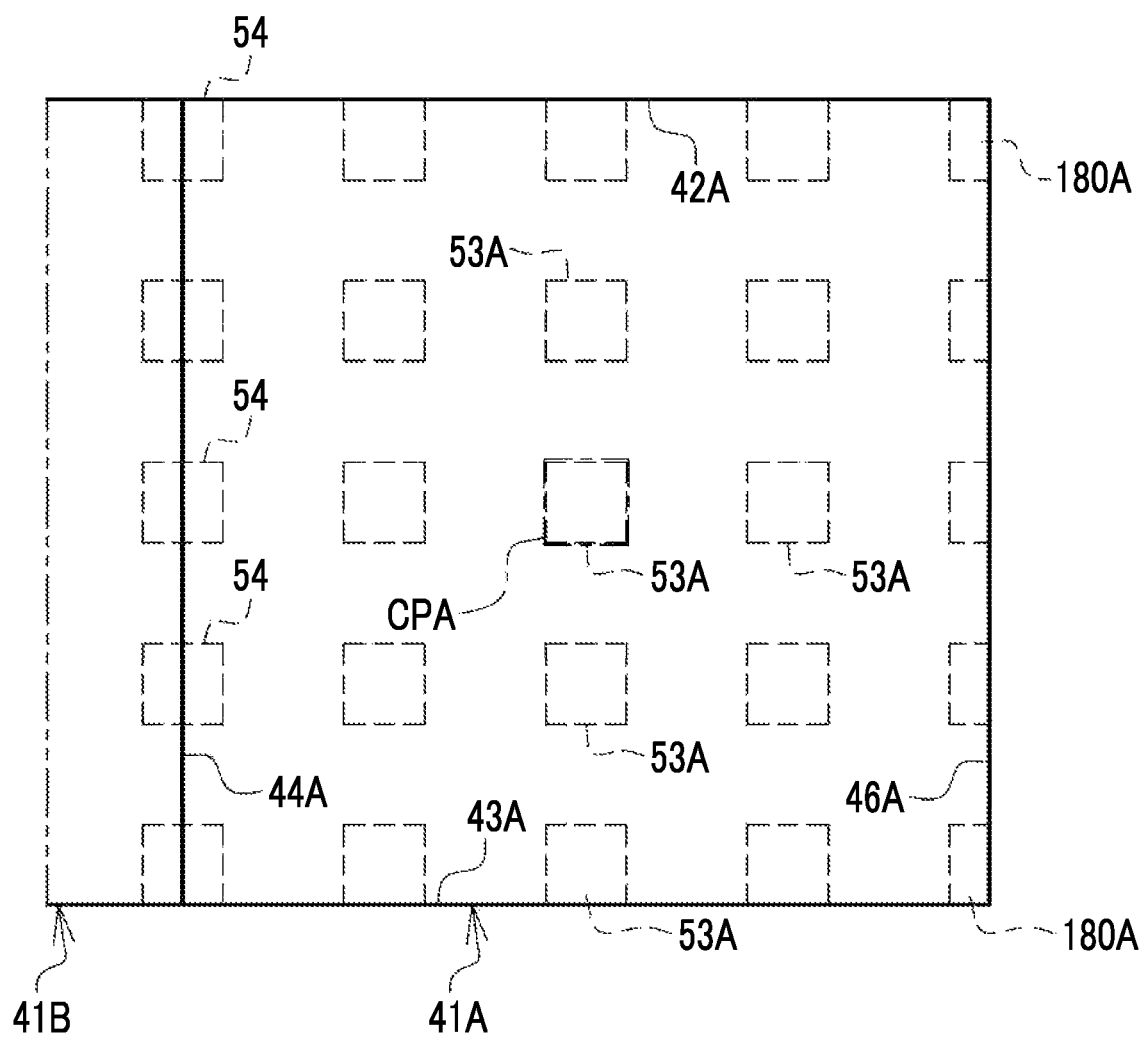
FIG. 24 is a diagram illustrating still yet another example of the position fixed by the fixing member.

In FIG. 24, a plurality of fixing members 53A are arranged at equal intervals in a matrix. Rectangular fixing members 180A having a size that is half of the size of the fixing member 53A are provided on the side 46A.

Figure 21:
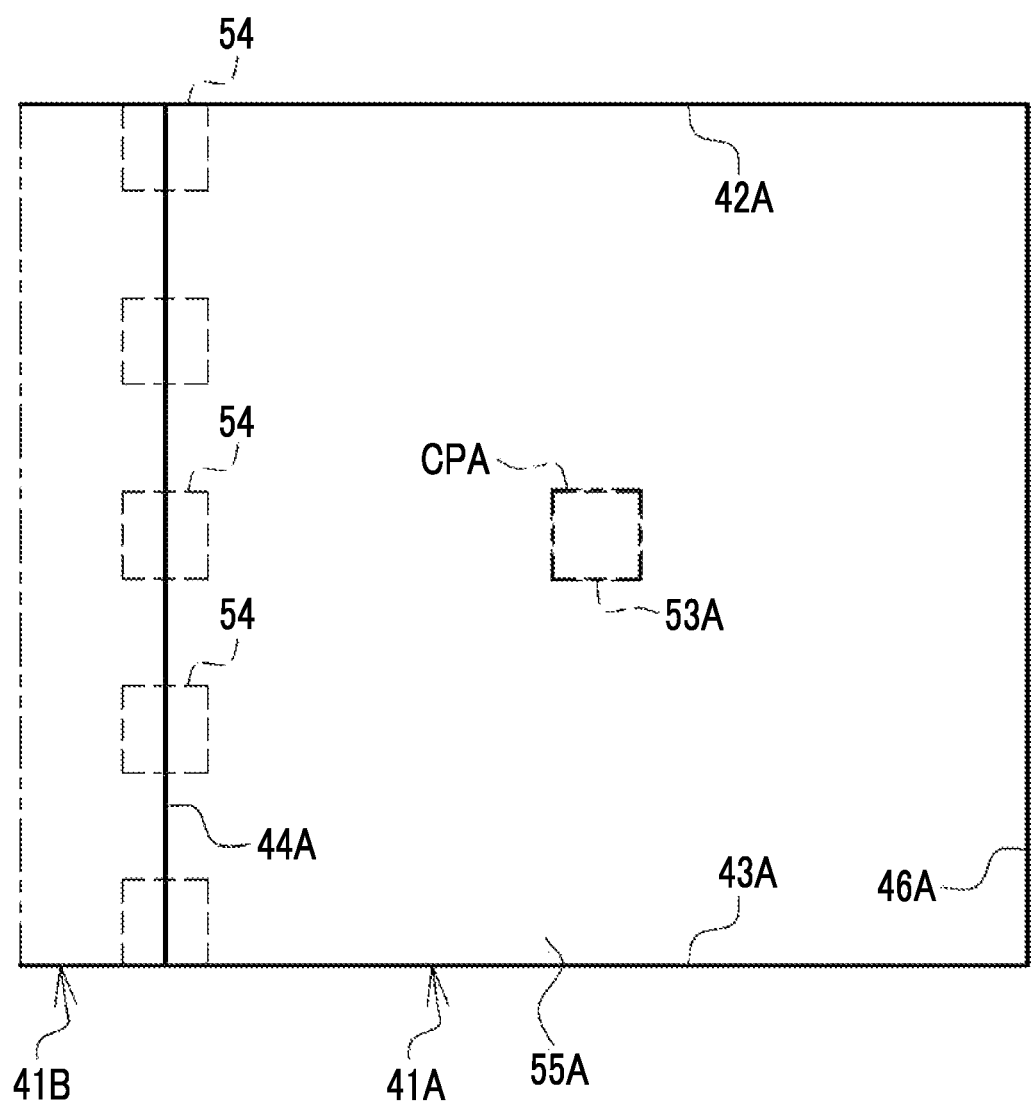
FIG. 21 is a diagram illustrating another example of a position fixed by a fixing member.

As illustrated in FIG. 21, the sensor panel 41 may be fixed to the attachment surface 51 by the fixing member 53 at least in the central portion CP of the first surface 52. Further, as illustrated in FIGS. 21 to 23, the sensor panel 41 may be fixed to the attachment surface 51 by the fixing members 53 at symmetrical positions around the central portion CP of the first surface 52. This makes it possible to improve the balance of the fixing force as compared to a case in which the positions fixed by the plurality of fixing members are not the symmetrical positions around the central portion CP.

Figure 25:
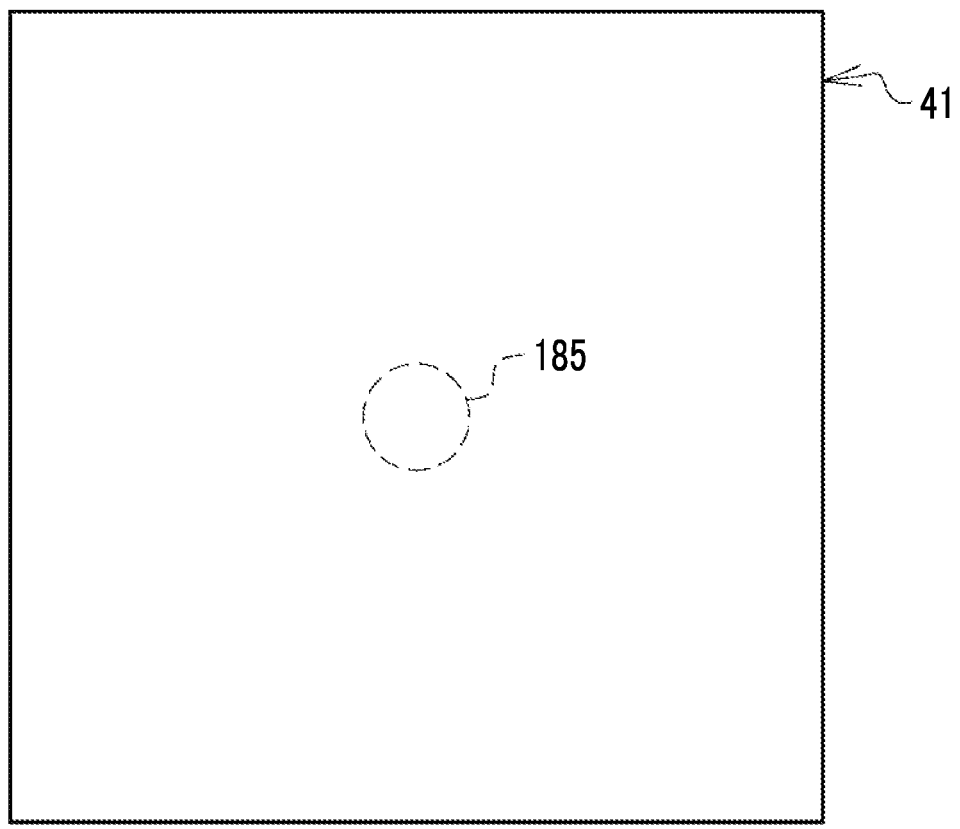
FIG. 25 is a diagram illustrating a circular fixing member.

The region fixed by the fixing member may not have the square shape. The fixed region may have a rectangular shape as illustrated in the fixing member 180A in FIG. 24. Further, the fixed region may have, for example, a regular triangular shape or a regular hexagonal shape. Alternatively, the fixed region may have a circular shape as in the fixing member 185 illustrated in FIG. 25. In a case in which the fixed region has a circular shape, it is possible to improve the balance of the fixing force as in the case of the regular polygonal shape. In addition, the term "circular shape" indicates a "circular shape" including an error that is generally allowed in the technical field to which the technology of the present disclosure belongs and does not depart from the gist of the technology of the present disclosure, in addition to a perfect "circular shape".

The shape of the curved attachment surface 51 is not limited to the arc surface shape given as an example. The shape may be an elliptical arc surface shape or a bowl shape such as a parabolic antenna shape. Further, the number of sensor panels 41 is not limited to two in the above-mentioned example. The number of sensor panels 41 may be one or three or more. Furthermore, the frame 18 is not limited to the circular ring and may be a polygonal ring.

The contact members 56 to 58 may be configured so as to transmit the radiation R. For example, the contact members 56 to 58 are formed of a low-density foam. For example, the contact members 56 to 58 are configured to transmit 90% or more of the radiation R emitted at a tube voltage of about 120 kV. With this configuration, the possibility that the contact members 56 to 58 will be reflected in the projection image and thus the tomographic image TI is lower than that in a configuration in which the contact members 56 to 58 are brought into contact with the imaging region 100.

The example in which the rear surface of the substrate 90 is the first surface 52 has been described. However, conversely, the sensor panel 41 may be attached to the support table 50 such that the rear surface of the substrate 90 is the second surface 55. In addition, a position adjustment member for adjusting the position of the sensor panel 41 along the normal direction ND may be attached to, for example, the rear surface of the substrate 90. In this case, a rear surface of the position adjustment member is the first surface 52 or the second surface 55.

The CT apparatus 10 is given as an example of the radiography apparatus. However, the present disclosure is not limited thereto. The radiography apparatus may be a simple radiography apparatus that captures the projection images one by one while changing the angle. Further, a radiography apparatus may be used which includes a frame to which two sets of the radiation source 20 and the radiation detector 21 are attached, simultaneously irradiates the front surface and the side surface of the subject S with the radiation R to obtain two projection images, and investigates the anatomical shape of the hip joint and spine of subject S and the connection between the spine and the lower limbs.

The hardware configuration of the computer constituting the control device 12 can be modified in various ways. For example, the control device 12 may be configured by a plurality of computers separated as hardware in order to improve processing capacity and reliability. For example, the functions of the receiving unit 145 and the RW control unit 146 and the functions of the imaging control unit 147, the image processing unit 148, and the display control unit 149 are distributed to two computers. In this case, the two computers constitute the control device 12.

As described above, the hardware configuration of the computer of the control device 12 can be appropriately changed according to required performances, such as processing capacity, safety, and reliability. Further, not only the hardware but also an application program, such as the operation program 140, may be duplicated or may be dispersively stored in a plurality of storages in order to ensure safety and reliability.

In the above-described embodiment, for example, the following various processors can be used as the hardware structure of processing units performing various processes, such as the receiving unit 145, the RW control unit 146, the imaging control unit 147, the image processing unit 148, and the display control unit 149. The various processors include, for example, the CPU 132 which is a general-purpose processor executing software (operation program 140) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and/or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured using one or more of the various processors as the hardware structure.

In addition, specifically, an electric circuit (circuitry) obtained by combining circuit elements, such as semiconductor elements, can be used as the hardware structure of the various processors.

In the technology of the present disclosure, the above-described various embodiments and/or various modification examples may be combined with each other. In addition, the present disclosure is not limited to the above-described embodiment, and various configurations can be used without departing from the gist of the present disclosure. Furthermore, the technology of the present disclosure extends to a storage medium that non-temporarily stores a program, in addition to the program.

The above descriptions and illustrations are detailed descriptions of portions related to the technology of the present disclosure and are merely examples of the technology of the present disclosure. For example, the above description of the configurations, functions, operations, and effects is the description of examples of the configurations, functions, operations, and effects of portions according to the technology of the present disclosure. Therefore, unnecessary portions may be deleted or new elements may be added or replaced in the above descriptions and illustrations without departing from the gist of the technology of the present disclosure. In addition, in the content of the above description and illustration, the description of, for example, common technical knowledge that does not need to be particularly described to enable the implementation of the technology of the present disclosure is omitted in order to avoid confusion and facilitate the understanding of portions related to the technology of the present disclosure.

In the specification, "A and/or B" is synonymous with "at least one of A or B". That is, "A and/or B" means only A, only B, or a combination of A and B. Further, in the specification, the same concept as "A and/or B" is applied to a case in which the connection of three or more matters is expressed by "and/or".

All of the publications, the patent applications, and the technical standards described in the specification are incorporated by reference herein to the same extent as each individual document, each patent application, and each technical standard are specifically and individually stated to be incorporated by reference.

What is claimed is:

1. A radiation detector comprising:
   a support table in which an attachment surface having a curved surface shape is formed;
   a sensor panel that has an imaging region in which pixels, which include thin film transistors and detect radiation, are two-dimensionally arranged and has a first surface attached to the attachment surface following the curved surface shape;
   a fixing member that partially fixes the first surface to the attachment surface; and
   a contact member that comes into contact with a second surface of the sensor panel which is opposite to the first surface.

2. The radiation detector according to claim 1, wherein the contact member biases the sensor panel to the attachment surface.

3. The radiation detector according to claim 1, wherein the sensor panel is fixed to the attachment surface by the fixing member at least in a central portion of the first surface.

4. The radiation detector according to claim 1, wherein the sensor panel is fixed to the attachment surface by the fixing member at symmetrical positions around a central portion of the first surface.

5. The radiation detector according to claim 1, wherein a plurality of the fixing members are provided, and
positions fixed by the plurality of fixing members are arranged at equal intervals.

6. The radiation detector according to claim 1, wherein a plurality of the fixing members are provided, and
regions fixed by the plurality of fixing members have the same size.

7. The radiation detector according to claim 1, wherein a region fixed by the fixing member has a regular polygonal shape or a circular shape.

8. The radiation detector according to claim 1, wherein the contact member is deformed according to thermal expansion and contraction of the sensor panel in a direction parallel to the attachment surface.

9. The radiation detector according to claim 1, wherein, in the contact member, a first length along a normal direction to the attachment surface is larger than a second length along a direction parallel to the attachment surface.

10. The radiation detector according to claim 1, wherein a surface of the contact member which comes into contact with the second surface has a shape following the curved surface shape.

11. The radiation detector according to claim 1, further comprising:
    a holding member that holds the contact member and has a higher rigidity than the contact member.

12. The radiation detector according to claim 1, wherein the second surface has the imaging region and a non-imaging region which is provided around the imaging region and in which the pixels are not arranged, and
the contact member comes into contact with the non-imaging region.

13. The radiation detector according to claim 1, wherein a circuit board is attached to a first side of the sensor panel,
the contact member biases the sensor panel to the attachment surface, and
includes a first contact member that is disposed on the first side and a second contact member that is disposed on a second side of the sensor panel which faces the first side and to which the circuit board is not attached, and
the first contact member has a higher biasing force than the second contact member.

14. The radiation detector according to claim 1, wherein a circuit board is attached to the sensor panel, and
a radiation shielding member that shields the radiation to protect the circuit board is attached to the contact member.

15. The radiation detector according to claim 1, wherein a substrate of the sensor panel has a thickness that is equal to or less than 100 μm.

16. The radiation detector according to claim 1, wherein the support table is made of metal, and
a substrate of the sensor panel is made of a resin.

17. The radiation detector according to claim 1, wherein the number of sensor panels is two or more.

18. A radiography apparatus comprising:
    the radiation detector according to claim 1; and
    a radiation source that emits the radiation.

19. The radiography apparatus according to claim 18, further comprising:
    an annular frame to which the radiation detector and the radiation source are attached and in which a subject is positioned in a cavity; and
    a rotation mechanism that rotates the frame around the subject to capture radiographic images of the subject at different angles,
    wherein the curved surface shape is an arc surface shape.

20. The radiography apparatus according to claim 19, wherein the radiography apparatus is a computed tomography apparatus that obtains a tomographic image of the subject on the basis of the radiographic images captured at different angles.

21. The radiography apparatus according to claim 19, wherein the radiation source emits the radiation having a conical shape.

22. The radiography apparatus according to claim 19, wherein the subject is positioned in the cavity in either a standing posture or a sitting posture.

* * * * *